INVENTOR,
William B. Smith Whaley
BY David Lichtenstein
Att'y.

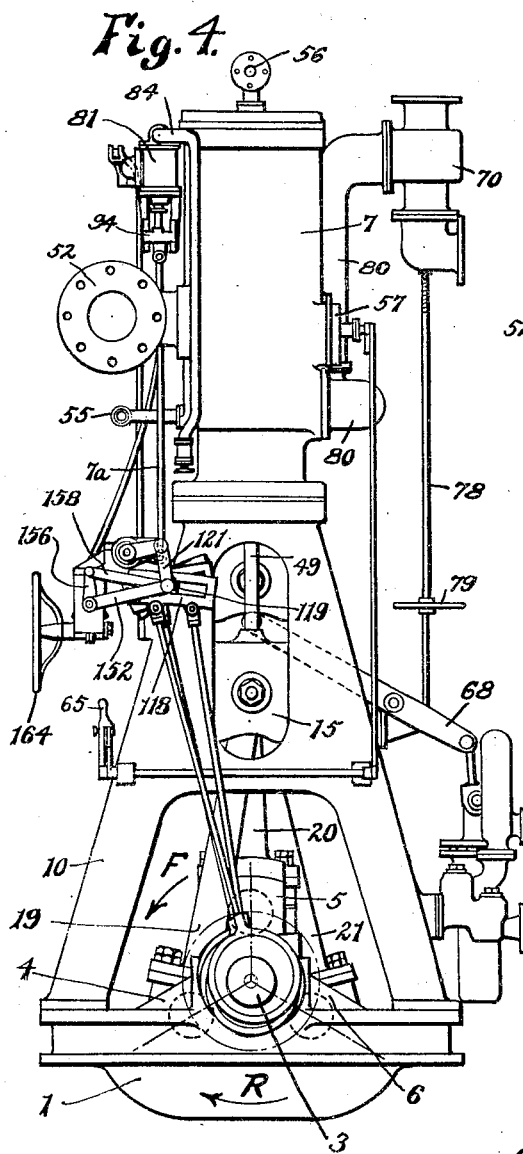
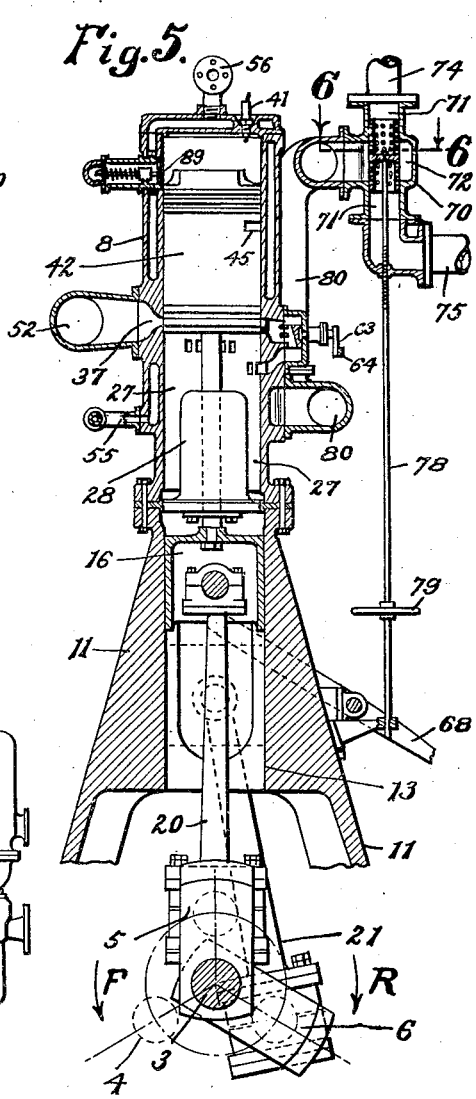
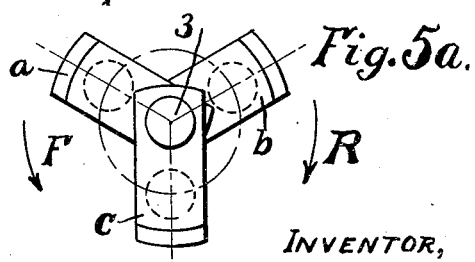
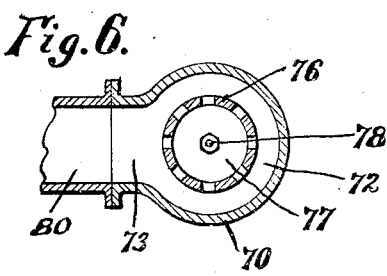

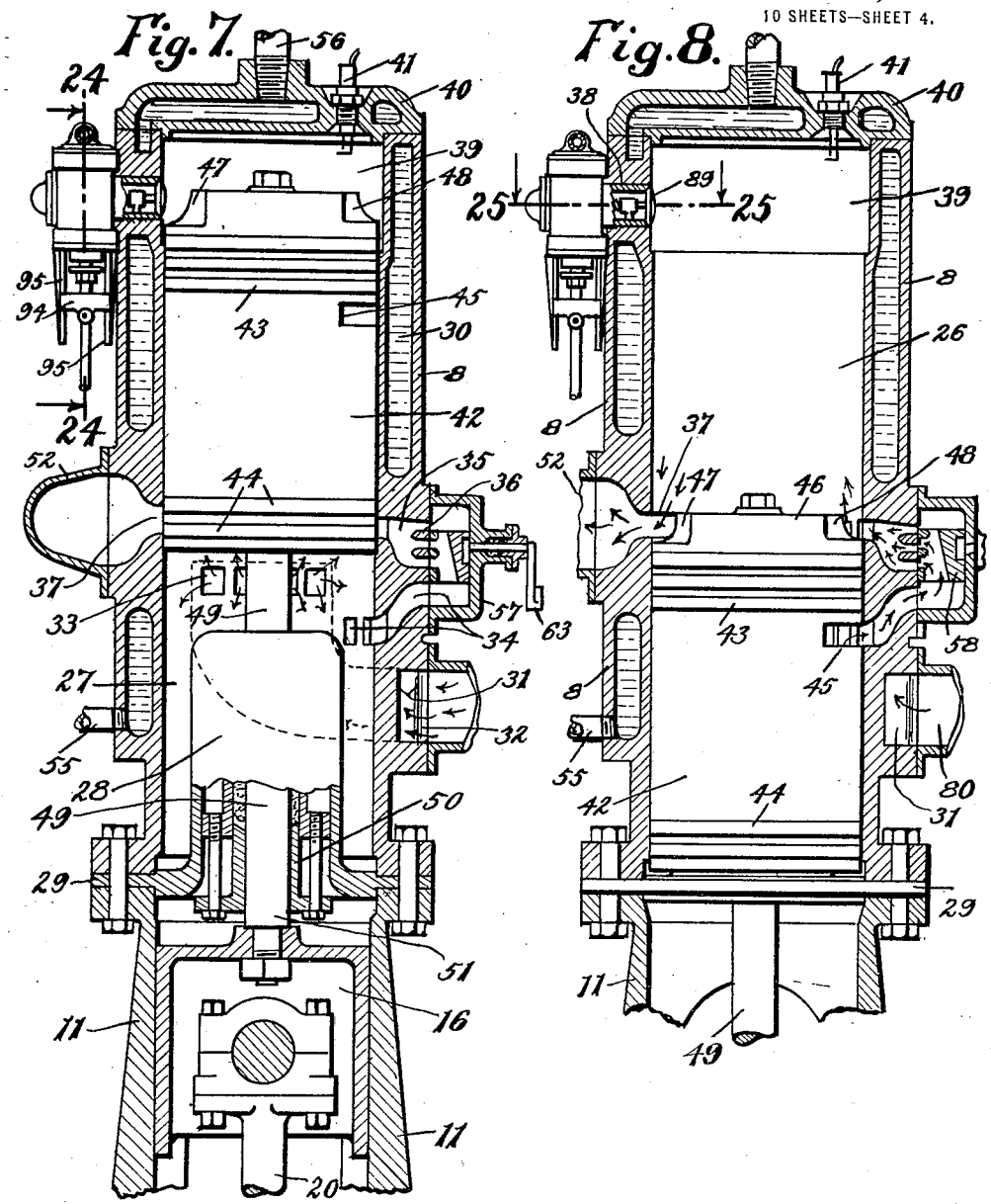

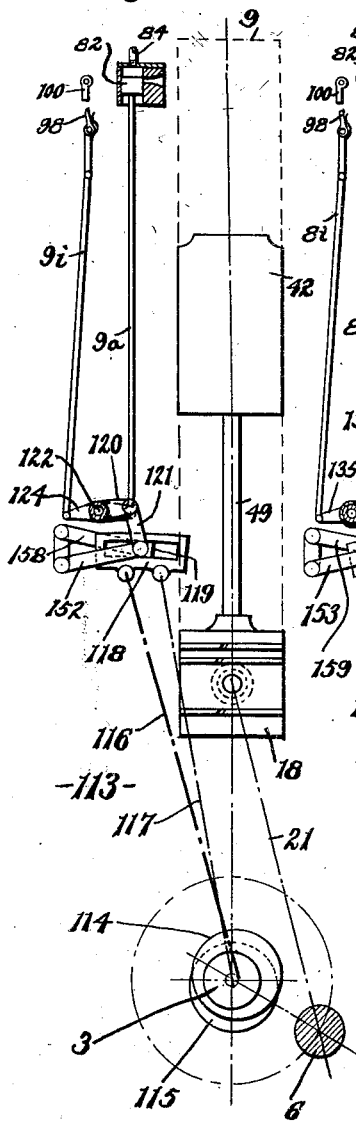
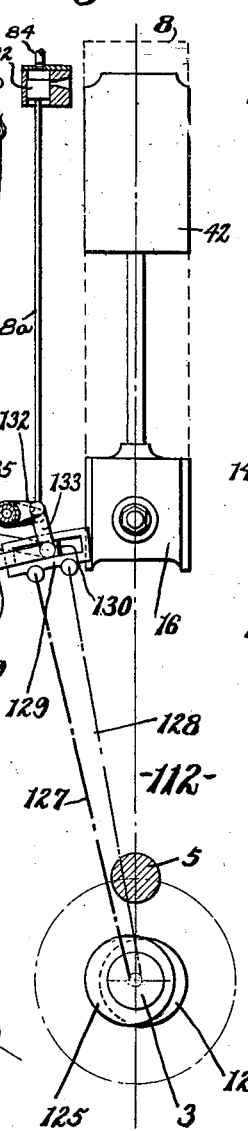
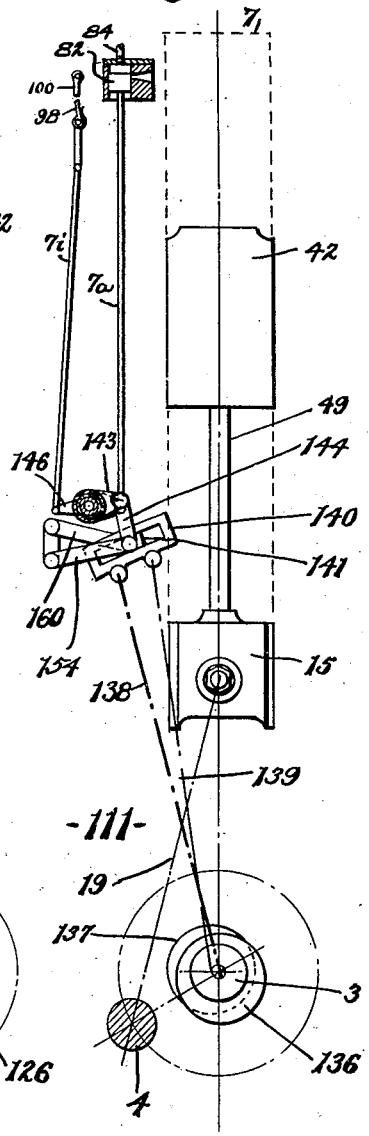

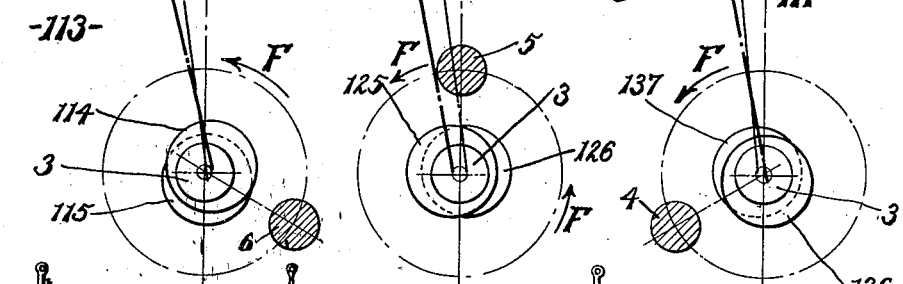

W. B. S. WHALEY.
INTERNAL COMBUSTION ENGINE.
APPLICATION FILED JAN. 9, 1917. RENEWED APR. 11, 1922.

1,430,480.

Patented Sept. 26, 1922.
10 SHEETS—SHEET 7.

INVENTOR,
William B. Smith Whaley
BY David Lichtenstein
ATT'Y.

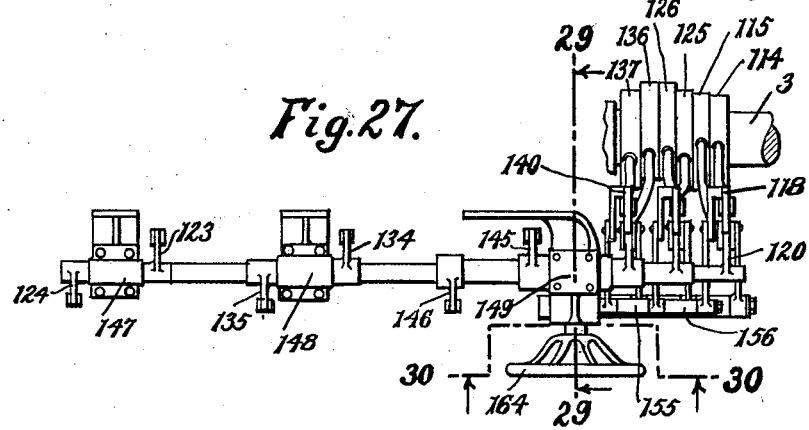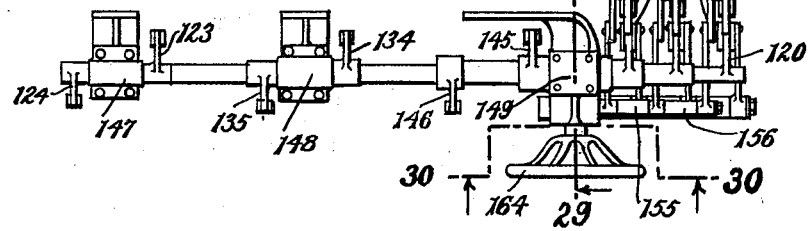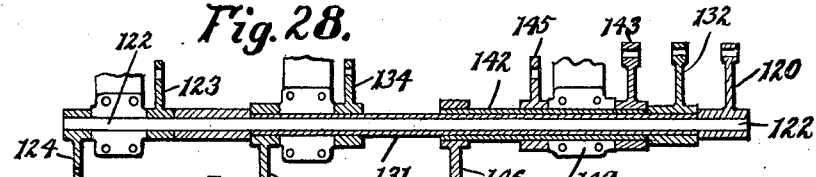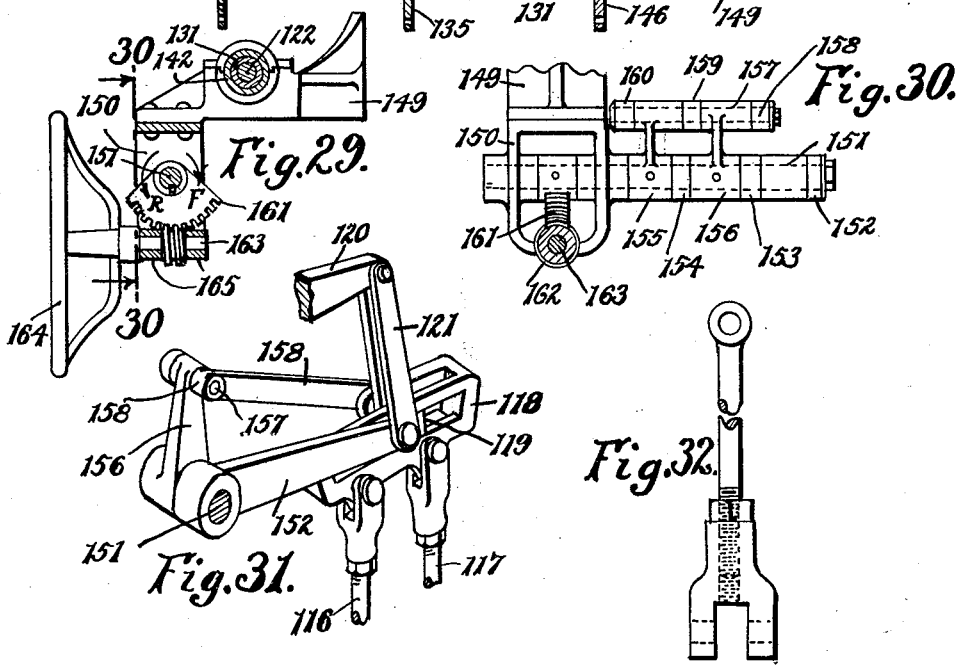

W. B. S. WHALEY.
INTERNAL COMBUSTION ENGINE.
APPLICATION FILED JAN. 9, 1917. RENEWED APR. 11, 1922.
1,430,480.
Patented Sept. 26, 1922.
10 SHEETS—SHEET 9.
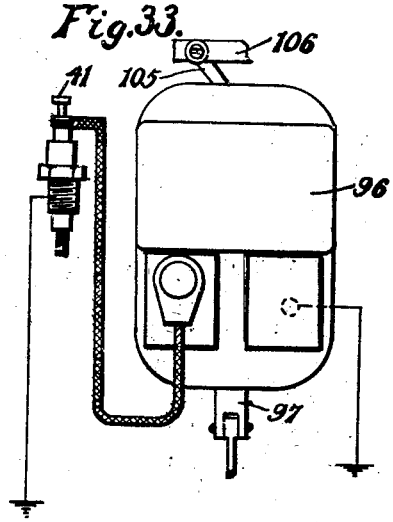
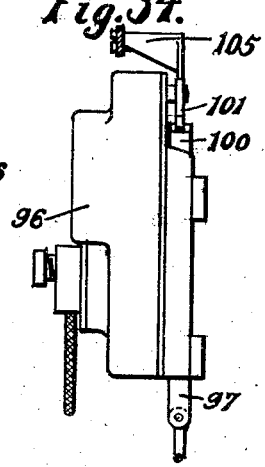
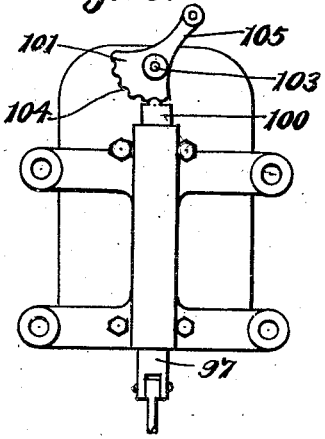
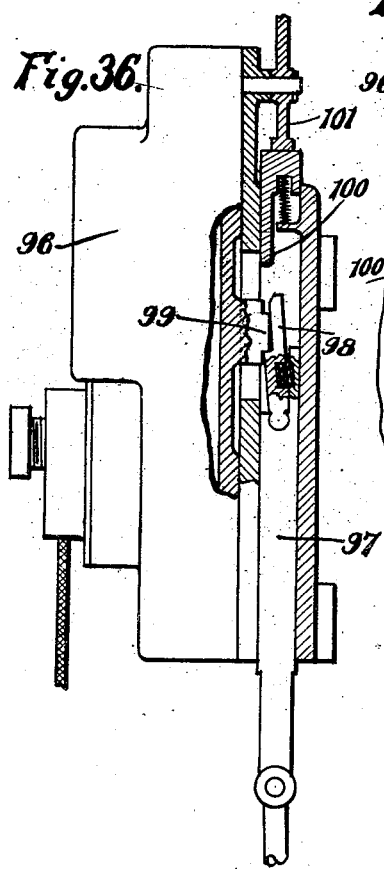
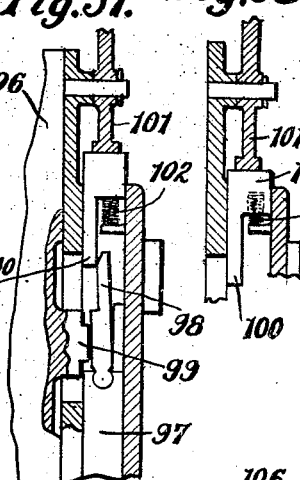
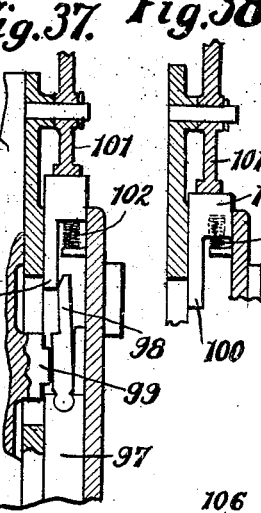
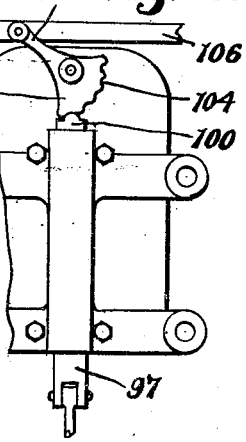
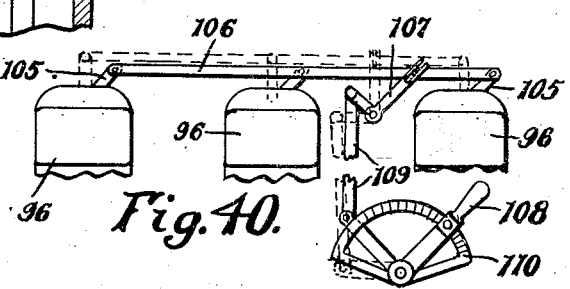
INVENTOR,
William B. Smith Whaley
BY David Lichtenstein
ATT'Y.

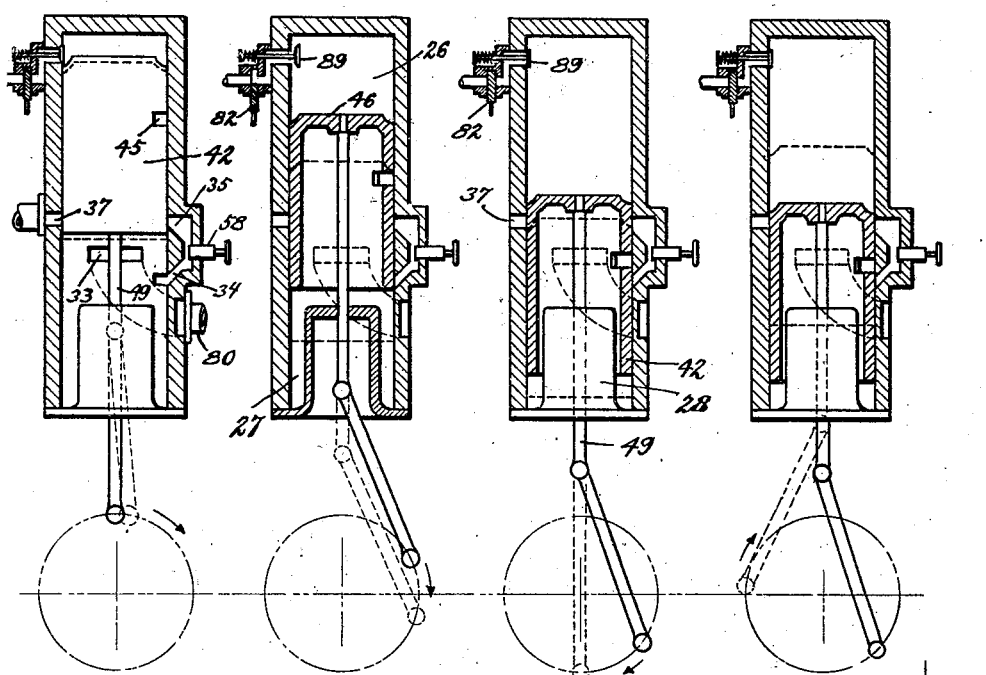
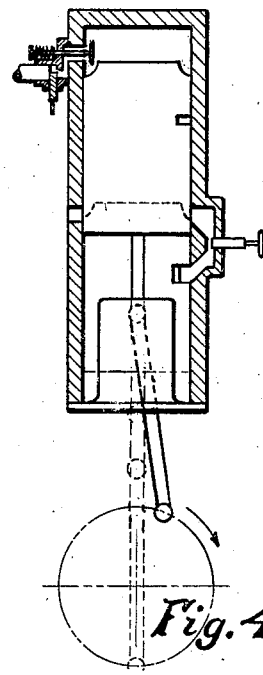
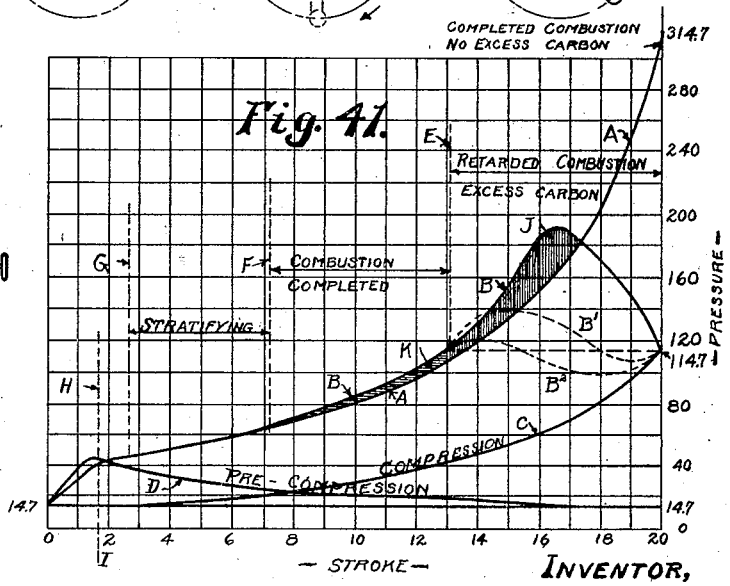

Patented Sept. 26, 1922.

1,430,480

UNITED STATES PATENT OFFICE.

WILLIAM B. SMITH WHALEY, OF NEW YORK, N. Y., ASSIGNOR TO AMERICAN WHALEY ENGINE COMPANY, OF BOSTON, MASSACHUSETTS, A CORPORATION OF MASSACHUSETTS.

INTERNAL-COMBUSTION ENGINE.

Application filed January 9, 1917, Serial No. 141,401. Renewed April 11, 1922. Serial No. 551,473.

*To all whom it may concern:*

Be it known that I, WILLIAM B. SMITH WHALEY, a citizen of the United States, residing at New York, in the county of New York and State of New York, have invented a new and useful Improvement in Internal-Combustion Engines, of which the following is a specification.

My invention relates to internal combustion engines which embody in their designs reciprocating types of valve mechanisms such as are used for air-starting, scavenging, fuel-injecting, or other such purposes, or reciprocating or oscillating types of ignition apparatus for sparking purposes, or both, and has for its object to provide a simple and reliable operating gear therefor, which will impart thereto the required actuations for operating the same and for timing the functions thereof to perform at the proper intervals to meet the working conditions of the engine with which the same are associated, according as the cycle or working thereof may require. To that end I employ in combination with the same the ordinary link-motions common to steam engine practice, as against the valve-gears usually employed with internal combustion engines, since the former are simple, durable, and reliable in their operations and allow for a much wider range of operation, relative to the variable working features thereof, than the latter, and are equally applicable to either the reversing or non-reversing types of internal combustion engines.

Another object is to provide an internal combustion engine which in appearance, performance, and flexibility of manipulation and operation will more nearly approach the characteristics of the steam engine, and to accomplish the same I employ an engine operating on my improved retarded combustion cycle (disclosed in my application for Letters Patent for internal combustion engines, filed in the United States Patent Office December 21, 1916, Serial No. 138,207, which requires the use of auxiliary valve mechanism and ignition apparatus therewith, and operates the same through the medium of the ordinary steam engine link-motions which are coupled with the crank-shaft of the engine and may be regulatably controlled through the manipulation of a hand-wheel to vary the operations of said mechanism and apparatus operated thereby according as the speed or working conditions of the engine may require,—said link-motions being applicable to reversing as well as non-reversing engines. Thus the combination of an engine of the character disclosed in my aforesaid application, wherein the cycle thereof, for an internal combustion engine, more nearly approaches the steam engine than any other internal combustion engine cycle known to the art and incidentally possesses the self-starting feature as well, along with the aforesaid steam engine types of link-motions and control therefor, provides an internal combustion engine which follows the lines of the steam engine and embodies all the advantages thereof as to simplicity of construction and flexibility of manipulation and operation, and may be suitable for land or marine purposes (reversing or non-reversing), and is applicable to any size of engine within practical limits.

Still another object is to provide an operating gear for internal combustion engines of the type disclosed in my aforesaid application, which, when employed with an engine having a plurality of cylinders, will enable the same to be self-starting and reversing in either direction, and will automatically and effectively operate the auxiliary valve mechanism and ignition apparatus of the different cylinders of the engine for relatively responding to the operations of said cylinders according as the engine requires when operating in either one or the other direction.

To illustrate my invention, and without being limited thereto, I have shown in the drawings one embodiment of my invention in the form of a three-cylinder self-starting reversing engine, having the double ended and valveless type of two-cycle cylinders, each being provided with an auxiliary valve and ignition apparatus therefor; and have employed therewith, for actuating purposes, one type of steam engine valve-gear commonly known as the "Stephenson Link" without being limited thereto, said link possessing both the variable and reversing features required for reversing engines, as shown in the drawings, where the crank-arms of the crank-shaft thereof are angularly disposed to allow the engine to operate and perform in either direction,—it being here noted that for non-reversing engines the ordinary so-called radial link-motion may be employed in the place thereof to equal advantage if desired.

The terms employed herein are used in the generic and descriptive sense, and therefore are not intended primarily as terms of limitation.

Referring to the accompanying ten sheets of drawings:

Fig. 4 represents the operating end of the engine.

Fig. 5 represents a cross sectional view taken through the middle cylinder of the engine as on line 5—5 Figs. 1 and 2 looking in the direction of the arrows.

Fig. 5ª represents a diagrammatic view showing another possible resting disposition of the cranks of the engine, wherein one of the pistons settles in the crank-end-dead-center instead of the head-end-dead-center shown in Figs. 4 and 5, since the tendency of a three-cylinder engine with angularly disposed cranks as shown will be to balance, therefore the engine will always assume a position, when at rest with a piston thereof, either in the head-end or crank-end dead-center, as shown in Figs. 5 and 5ª.

Fig. 6 represents a cross sectional view taken through lines 6—6, Fig. 5, looking in the direction of the arrows.

Fig. 7 represents the same view as Fig. 5 but shows the same enlarged.

Fig. 8 represents the same view as Fig. 7 but shows the piston moved to its lowest position in the cylinder.

Fig. 9 represents the throttle-valve section of the views shown in Figs. 7 and 8, but shows the throttle-valve shifted to the "closed" position, as against the "open" position thereof shown in said Figs. 7 and 8.

Fig. 10 represents a sectional view taken on line 10—10 Fig. 9 looking in the direction of the arrows.

Figure 1:
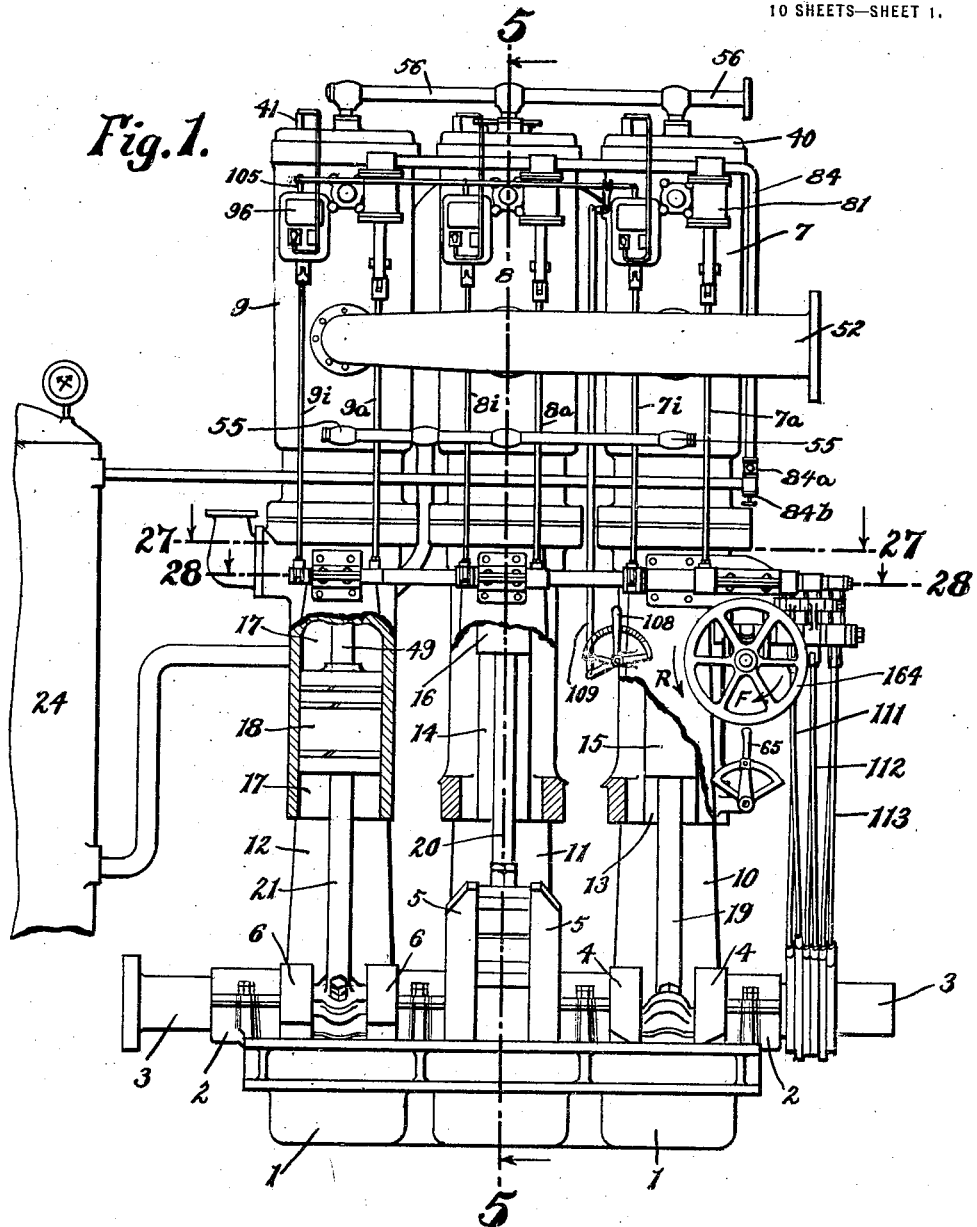
Fig. 1 represents a front and elevational view of an internal combustion engine embodying my invention, with the front portions of the frame members thereof partly broken away for showing the crank-shaft of the engine with the middle cylinder set in head-end-dead-center position.

Figs 11 represents a diagrammatic view of the operating gear with its relative auxiliary valve and ignition apparatus, corresponding to the left end cylinder shown in Fig. 1, the engine being at rest with the gear set in the "neutral" position.

Fig. 12 represents a diagrammatic view similar to Fig. 11 but corresponds to the middle cylinder of the engine shown in Fig. 1.

Fig. 13 represents a diagrammatic view similar to Figs. 11 and 12, representing the neutral position of the operating gear, et cetera, corresponding to the right end cylinder of the engine shown in Fig. 1.

Fig. 14 represents the same view as Fig. 11 but shows the operating gear shifted to the "full forward" position with the engine turning in the direction of the arrow marked "F".

Fig. 15 represents the same view as Fig. 12 but shows the operating gear shifted to "full forward", the engine turning in the direction of the arrow marked "F".

Fig. 16 represents the same view as Fig. 13 but shows the operating gear shifted to "full forward", the engine turning in the direction of the arrow marked "F".

Fig. 17 represents the same view as Fig. 11 but shows the operating gear shifted to "full reverse", the engine now turning in the direction of the arrow marked "R".

Fig. 18 represents the same view as Fig. 12 but shows the operating gear shifted to "full reverse", the engine turning in the direction of the arrow marked "R".

Fig. 19 represents the same view as Fig. 13 but shows the operating gear shifted to "full reverse".

Figure 20:
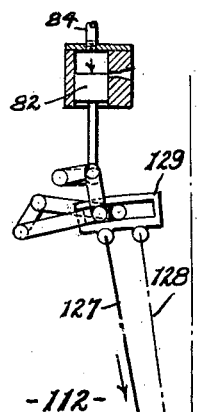

Fig. 20 represents a diagrammatic view of the middle cylinder of the engine, showing the crank-arm of the crank-shaft shifted into the position in which the operating gear for that cylinder is ready to open the auxiliary valve thereof, when the engine is operating "full forward", the engine turning in the direction of the arrow marked "F".

Figure 21:
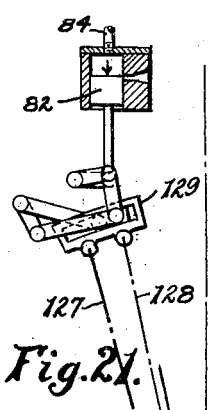

Fig. 21 represents a similar view to that shown in Fig. 20 and corresponds to the "full reverse" running of the engine, the engine turning in the direction of the arrow marked "R".

Figures 22, 23:
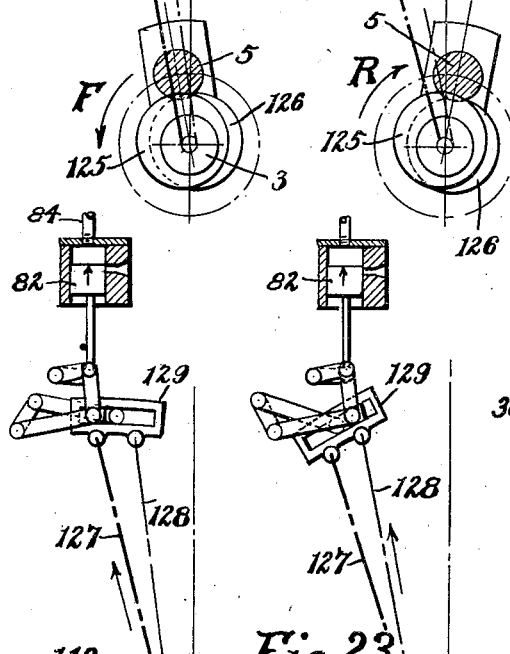

Fig. 22 represents the same view as Fig. 20, representing the engine running "full forward" and showing the position of the crank-arm of the crank-shaft for the middle cylinder of the engine, when the auxiliary valve for that cylinder is brought to the "closing" position, the engine turning in the direction of the arrow marked "F".

Fig. 23 represents the same view as Fig. 22 but shows the engine running "full reverse", the engine turning in the direction of the arrow marked "R".

Figure 24:
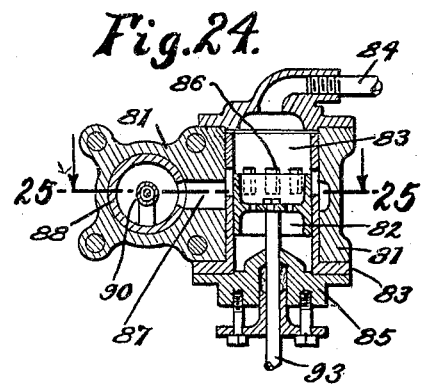

Fig. 24 represents a section taken on line 24—24, Fig. 7, looking in the direction of the arrows.

Figure 25:
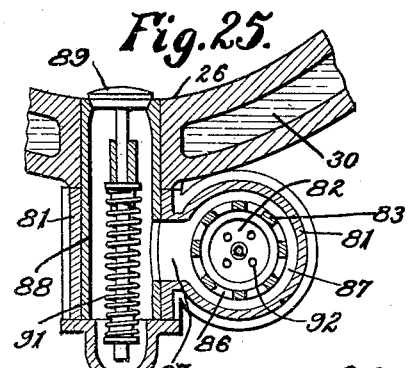

Fig. 25 represents a sectional view taken through lines 25—25, Figs. 8 and 24, looking in the direction of the arrows, showing the automatic co-acting air-valve in the "closed" position.

Figure 26:
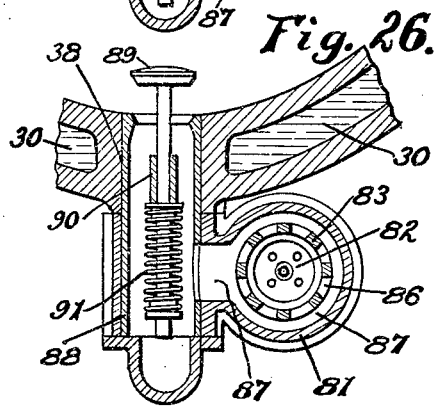

Fig. 26 represents the same view as Fig. 25 but shows the automatic co-acting air-valve "open".

Fig. 27 represents a plan view taken on line 27—27 in Fig. 1 looking in the direction of the arrows.

Fig. 28 represents a sectional view taken on line 28—28 in Fig. 1 looking in the direction of the arrows.

Fig. 29 represents a part sectional view taken on line 29—29 Fig. 27 looking in the direction of the arrows.

Fig. 30 represents a view taken on line 30—30 Figs. 27 and 29 looking in the direction of the arrows.

Fig. 31 represents a perspective view of the link end of the operating gear.

Fig. 32 represents an adjustable form of connecting-rod which may be used for the auxiliary valves and the ignition apparatus.

Fig. 33 represents a diagrammatic view of the ordinary type of igniter shown coupled with an ordinary spark-plug.

Fig. 34 represents an end view of the igniter shown in Fig. 33.

Fig. 35 represents the rear view of the igniter shown in Figs. 33 and 34.

Fig. 36 represents an enlarged end view of the igniter shown in the preceding figures, showing the igniter partly broken away, with the operating latch member thereof engaged with the armature member of the igniter and in the act of raising the same.

Fig. 37 represents the same view as Fig. 36 but shows the engaging-latch-member disengaged from the armature member, with the latter dropped to its lower position.

Fig. 38 represents the same view as Figs. 36 and 37 but shows a variable timing wedge adjusted in its lowest position for providing earliest sparking.

Fig. 39 represents the same view as Fig. 35 but shows the adjusting cam of the igniter shifted to the opposite position, corresponding to that shown in Fig. 38, for providing earliest sparking.

Fig. 40 represents a diagrammatic view showing the adjusting cams of the igniters coupled together and shifted to the extreme position shown in Fig. 39, as against the mid position shown in Fig. 1.

Fig. 41 represents a theoretical chart of the cycle of the engine herein employed and described.

Fig. 42 represents a diagrammatic view showing the piston of the cylinder ready to start down on the firing stroke, when the main compressed air-admitting-valve, as well as its co-acting valve, are closed, as shown; the dotted lines indicating the position of the piston corresponding to the position thereof when said main air-admitting-valve of the compressed air system for the engine starts to open.

Fig. 43 represents the position of the piston and the relative conditions of the main compressed air-admitting and co-acting valves, corresponding to a point somewhat in advance of the point "E" of retarded combustion shown on the card in Fig. 41, the dotted lines in Fig. 43 indicating the position of the piston corresponding to the point of completed combustion also indicated on the card in said Fig. 41, when the stratifying operation in the cylinder commences.

Fig. 44 represents the position of the piston when the stratifying medium ceases to be admitted into the cylinder, and therefore the main air-admitting-valve and its co-acting valve are closed, as shown.

Fig. 45 represents the position of the piston on its firing stroke cracking the exhaust-port,—the dotted position representing the piston on its up and compression stroke in the combustion chamber of the engine.

Fig. 46 represents the piston being started on the down stroke by the pressure of the incoming compressed air through the main air-admitting-valve and its co-acting valve as may occur for starting purposes.

Like numerals refer to like parts throughout the several views of the drawing.

Figure 2:
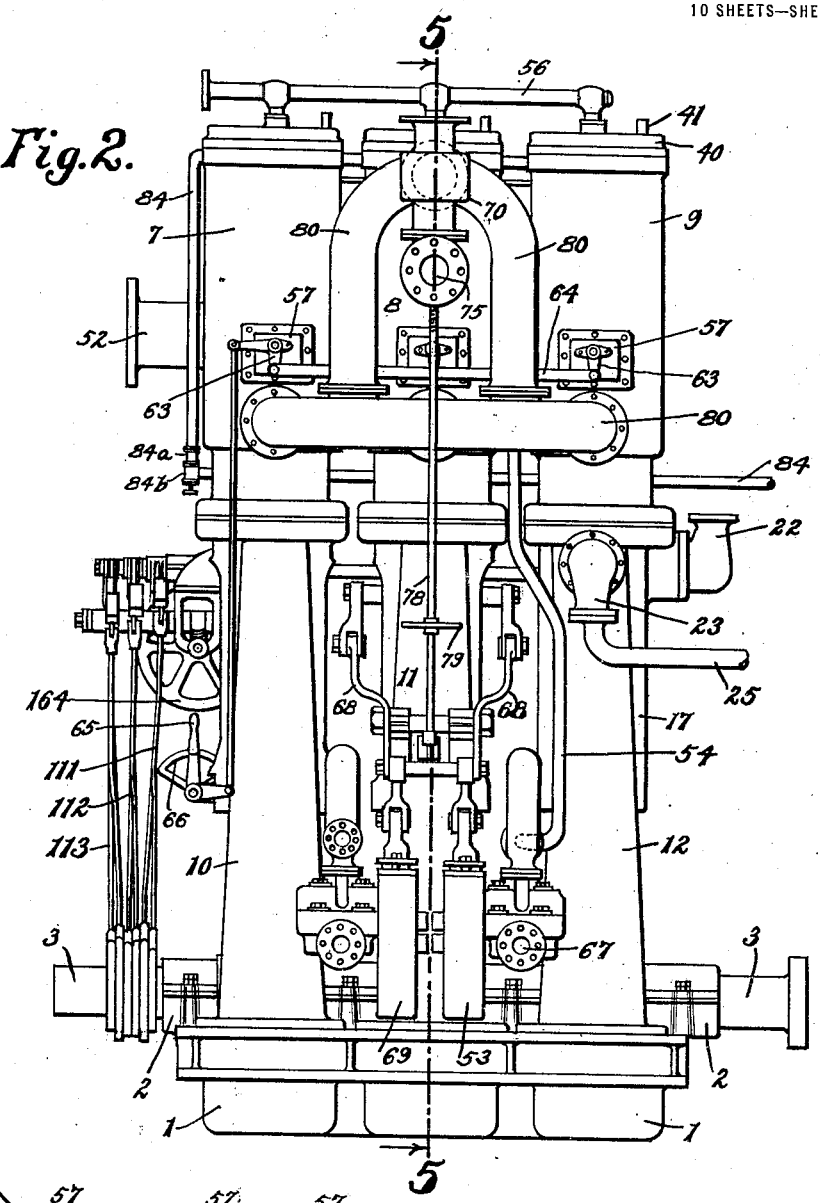
Fig. 2 represents a back elevational view of the engine shown in Fig. 1.
Figure 3:
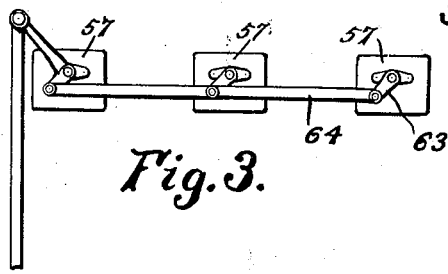
Fig. 3 represents the throttle-valve-levers of the different throttle-valves of the engine shifted to one of the extreme positions by the shifting mechanism provided therefor.

The numeral 1 represents the engine bed which is provided with the bearings 2 in which the crank-shaft 3 operates and which crank-shaft is provided with the angularly disposed crank-arms 4, 5 and 6 for the cylinders 7, 8 and 9, respectively. The cylinders are preferably supported upon individual frame members 10, 11 and 12, respectively, as shown in Figs. 1, 2 and 4, and may be bolted or otherwise secured to the engine bed 1 in any suitable manner,—two of said frame members, namely, 10 and 11, being provided with the guide-runs 13 and 14 for the cross-heads 15 and 16, respectively, the frame member 12 being preferably trunked and provided with the air-cylinder 17 in which the piston 18 operates both as a crosshead for the cylinder 9 and as an air pump for supplying the necessary compressed air for the air system of the engine, the cross-heads 15, 16 and 18 being connected with the crank-pins of the crank-arms 4, 5 and 6 of the crank-shaft 3 by the connecting rods 19, 20 and 21, respectively.

The numeral 22 represents the inlet-valve for the air-pump-cylinder 17, and 23 represents the outlet-valve which connects with the compressed air-receiver 24 by any suitable means, as by the pipe 25 for charging the same with the air compressed in said air-pump.

Each of the cylinders 7, 8 and 9, as for example the cylinder 8 in Figs. 5, 7 and 8, is provided with the combustion chamber 26 at the top thereof and the pre-compression chamber 27 at the lower part thereof, the latter end of the cylinder being provided preferably with the removable type of inner-cylinder or displacer 28 which is suitably fitted and secured within the pre-compression end 27 of the cylinder, as by means of the flange 29 being bolted between the cylinder itself and the frame-member 11 of the engine. The cylinder is preferably provided with the water-jacket 30 wherever possible; the fuel intake-jacket 31, which is open at 32 to the fuel intake pipe or manifold and terminates in suitable intake-ports 33 which communicate with, and are open, to the pre-compression chamber 27, preferably toward the upper part thereof; the pre-compression transfer-port 34 which is open to the pre-compression chamber 27; the combustion chamber transfer inlet port 35 which opens into the combustion-chamber 26 and is preferably bridged with the gridiron-bars 36 at the entrance thereof and form the spaces between them as shown in Figs. 7, 8 and 9; the exhaust port 37 which is open to the lower end of the combustion-chamber 26 of the cylinder; and the compressed air-co-acting-cylinder-valve-opening 38 which is preferably located in the clearance-chamber 39 of the combustion-chamber 26.

40 represents a cylinder head which may be made integral with the cylinder or rigidly secured thereto in any suitable manner, according as may be desired, and is provided with the spark-plug 41. 42 represents a skirt-type of piston and is preferably provided with the upper and lower piston rings 43 and 44 respectively, between which is located the pre-compression discharge or transfer-port 45 which registers with the pre-compression transfer port 34, when in the lower part of its stroke, as shown in Fig. 8. The piston-head 46 on the exhaust side thereof is preferably provided with the scooped exhaust-port-section 47 and on the intake side thereof is preferably provided with the inlet-baffle-section 48. 49 represents the piston-rod which is secured to the piston 42 in any suitable manner and slidably operates within the gland-box 50 which is preferably provided therefor in the inner-cylinder 28, Fig. 7. The lower end 51 of the piston-rod 49 is coupled in any suitable manner with the cross-head 16 or the trunk-piston 18, as the case may be, and which slidably operates in the frame-members of the engine.

52 represents a common exhaust pipe for the engine, which is coupled with the exhaust-ports 37 of the cylinders 7, 8 and 9 as shown in Fig. 1. 53 (Fig. 2) is an ordinary water pump which discharges through the pipe 54 and enters into the water-jackets 30 of the cylinders of the engine through the water inlet-pipes 55 in the lower portions of said water-jackets from where the water circulates upward towards the top of the cylinders in said water-jackets and is discharged therethrough through the water discharge pipe 56, Figs. 7 and 8.

57 represent the transfer-throttle-valve-casings which are rigidly secured to the cylinders for enclosing the transfer-ports 34 and 35 thereof and for housing the slidable throttle-valves 58 which are of the flat type and are provided with the main-ports 59; the co-acting gridiron bars 60; and the eccentric-recess 61 in which operate the operating eccentrics 62. The eccentrics 62 are secured to operate with the transfer-throttling-levers 63 by means of which the throttling-valves 58 may be set into any desired positions in relation to the gridiron bars 36, to allow any desired throttling of the transferring fuel mixture, which, after it has been pre-compressed in the pre-compression chamber of the cylinder, is then transferred into the combustion-chamber thereof through the transfer-valve 58, as represented by the small arrows Fig. 8.

The transfer-valve-levers 63 are pivotally connected with the coupling-link 64 which may be shifted into any desired position through the manipulation of the throttling-lever 65 on the arc 66 provided therefor, as shown in Figs. 1, 2 and 4. 67 is the inlet for the water pump 53 which is actuated by the working-beam 68, preferably from a cross-head, as shown in Figs. 2, 4 and 5. 69 is an auxiliary water-pump which may be employed as a fire pump, or, in the case of marine engines, as a bilge pump.

70 represents a fuel mixing and proportioning valve-casing for the engine, and is provided with the bore 71, the mixing compartment 72, and the outlet 73 therefor—the bore 71 being open at one end to the gas supply pipe 74 and at the other end to the air supply pipe 75 (Fig. 5). 76 represents the perforated piston-valve which slidably fits the bore 71 and is divided off by the partition-wall 77, to which is secured the adjusting-spindle 78 which is preferably supplied with the hand-wheel 79 by means of which the valve 76 may be positioned within the mixing valve casing 70 for allowing the proper proportions of fuel-constituents to enter into the intake pipe 80, which is open to the mixture intake ports 32 of the cylinders of the engine.

81 represents a valve-casing for the main compressed air-admitting-valve 82, which casing is suitably secured to the cylinder in any suitable manner, as for example as shown in Figs. 1, 24 and 25, and is preferably provided with the ported-valve-sleeve 83, which is open to the compressed air receiver supply pipe 84 at the top thereof and is secured in position with the casing 81 by means of the cap-member 85 shown in Fig. 24. The ports 86 of the sleeve-member 83 open into the chamber 87, which in turn is open to and discharges into the co-acting valve casing 88 which fits within the valve opening 38 provided therefor in the cylinder (Fig. 8) and which slidably supports the coacting cylinder valve 89 in the supporting-lug 90 provided therefor and which valve is ordinarily seated in the casing 88 by means of the expansion-spring 91 acting upon the valve as shown in Figs. 5 and 25.

The piston valve 82 is preferably provided with the perforations 92 for preventing the pocketing of the compressed air in the lower part of the valve-casing, as might otherwise be the case and which occurrence might be likely to interfere with the balancing features of the valve. The piston-valve 82 is provided with the spindle 93 which projects through the cap-member 85 and is preferably provided with the cross-hand end 94 which preferably operates on the guides 95 provided therefor.

96 represents an ordinary high tension igniter of the ordinary type, as for example the so-called "Wico igniter," which is adapted in its operation to magnetize and suddenly demagnetize one or more magnetic coils positioned within a permanent magnetic field; or in other words to suddenly demagnetize the magnetic core of said coil as distinguished from the make and break and direct induction systems and devices and is operated by a reciprocating action,—it being here noted that other types of igniters may be employed to equal advantage, as for example, the so-called "Bosch igniter" which operates on an oscillating stroke instead of a reciprocating stroke and with but little modification may be coupled with the operating gear of the engine to comply with the requirements of the engine.

97 represents the slidable ignition operating bar which carries the pivoted latch 98 and engages in the up-stroke thereof by means of said latch with the armature-bar 99, as shown in Fig. 36, and disengages therefrom when said latch comes into contact with the timing-wedge 100, as shown in Fig. 37, when the armature of the igniter is allowed to drop, and in so doing, generates the current which causes the sparking of the spark-plug 41. The timing-wedge 100 is slidably fitted within the igniter and is forced against the adjusting-timing-quadrant 101 by the action of the expansion-spring 102. The timing quadrant 101 is pivotally secured to the igniter at 103 and is provided with the graduated cam sections 104, which sections offer a range of adjustment for the timing-wedge 100, as may be observed from Figs. 35, 38 and 39. The timing-quadrant-levers 105 are pivotally connected to the connecting-bar 106, Figs. 1 and 40, which in turn engages with the bell-crank 107 which is coupled with the bell-crank-operating-lever 108 by the connecting-link 109 and which lever may be set with the arc 110 to suit the peculiar requirements of the engine.

The engine as shown in the drawings being a three-cylinder self-starting and reversing engine, it will be noted that each of the cylinders 7, 8 and 9 thereof are provided with individual link-motions as 111, 112 and 113, respectively, Figs. 1 and 2, 11, 12 and 13. The link-motion 113 (Fig. 11) consists of a set of forward and reverse eccentrics 114 and 115, respectively, which are rigidly secured to the crank-shaft 3 of the engine to operate therewith, and are set ahead of the crank of the cylinder with which the link-motion is operating, to lead the said crank by one eccentric or the other, according as the engine is running, in either direction. The eccentrics 114 and 115 are each provided with the eccentric-rods 116 and 117, respectively, and are pivotally connected with the link 118 (Figs. 4 and 11) in the slot of which link operates the sliding-block 119 which is connected with the cylinder 9 timing-crank-arm 120 through the links 121,—said cylinder 9 timing-crank 120 being connected with the cylinder 9 timing-shaft 122 which reaches across the engine, as shown in Figs. 27 and 28, and is supplied with the air-timing-rocker-arm 123 and the igniter-timing-rocker-arm 124, both of said rocker-arms being rigidly secured to said timing-shaft 122 for operating therewith.

In a similar manner the middle cylinder 8 is provided with the forward and reverse eccentrics 125 and 126 which are secured to the shaft 3 to operate therewith and are provided with the forward and reverse eccentric-rods 127 and 128, respectively. Said rods being pivotally secured to the link 129 which is provided with the sliding-block 130 and which operates the middle cylinder timing-shaft 131, which carries secured thereto the timing crank 132, through the connecting-link 133 pivotally engaging with said timing-arm 132, Fig. 12; said timing-shaft 131 preferably telescoping the timing-shaft 122, as shown in Fig. 28, and provided with the middle cylinder air-timing rocker-arm 134 and the igniter timing-rocker-arm 135 both of which arms are rigidly secured to said shaft 131 to operate therewith.

Again, in a similar manner the end cylinder 7 is provided with the link-motion 111 which consists of the forward and reverse eccentrics 136 and 137 which are rigidly secured to operate with the crank-shaft 3 as shown in Fig. 13, and are provided with the forward and reverse eccentric-rods 138 and 139, respectively, which are pivotally secured to the link 140 within which link the sliding-block 141 operates. The block 141 operates the end cylinder 7 timing-rocker-shaft 142 through the crank-arm 143 which is rigidly secured to operate with said shaft 142, through the links 144 pivotally connecting said crank-arm 143 with the link-block 141. The shaft 142, which telescopes the shaft 131, as shown in Fig. 20, is also provided with the air-timing-valve rocker-arm 145 and the igniter rocker-arm 146, said arms being secured to said shaft 142 to rotate therewith. The telescoping rocker-shafts, namely, 122, 131 and 142 are suitably supported in the bearing brackets 147, 148 and 149 which are rigidly secured to the engine frame members 12, 11 and 10 respectively, as shown in Fig. 1. The bearing bracket 149 carries rigidly secured thereto or integral therewith, the segment-bracket 150, Figs. 29 and 30, which forms the bearing for the segment-shaft 151 to which shaft are pivotally secured the link-block-guide-rods 152, 153, and 154, the link shifting-arms 155 and 156 which are secured to said segment-shaft 151 and carry the stud 157 upon which are pivotally secured the link-shifting-rods 158, 159 and 160 which are secured to the links 118, 129 and 140, respectively. The segment-shaft 151 also carries secured thereto the operating spiral segment 161 which is operated by the operating worm-gear 162, Figs. 29 and 30, which gear is secured to rotate with the shaft 163 of the operating hand-wheel 164, which wheel is supported in said segment bracket by the shaft 163 which is rotatably mounted in the bearings 165 provided therefor in the segment-bracket 150.

7$^a$, 8$^a$ and 9$^a$ represent the reach-rods for the air-timing valves coupled with the cylinders 7, 8 and 9, respectively, which rods preferably pivotally engage with the crossheads 94 of the air-valves and with their respective rocker-arms provided therefor on the rocker-shafts 122, 131 and 142; and 7$^i$, 8$^i$ and 9$^i$ represent the reach-rods for the igniters of the cylinders 7, 8 and 9, respectively, which reach-rods are preferably pivotally coupled with the operating-bar 97 of the igniters and the respective rocker-arms provided therefor on said rocker-shafts. The reach-rods in either case, whether for the air-timing-valve mechanism or ignition apparatus, may be made adjustable if desired, as is indicated in Fig. 32, or in any other suitable manner, the rod in Fig. 32 being threaded and fitted into the forked coupling which may be adjusted and set in any desired position along the rod for giving the rod the required length to suit conditions.

In Fig. 44 "A" represents the adiabatic curve of an internal combustion engine operating on an explosive charge compressed to 114.7 lbs. ab., while "B" represents the working curve on an internal combustion engine operated on my improved retarded combustion cycle hereinafter described and disclosed in my aforesaid application; "C" represents the compression curve in the combustion-chamber; "D" represents the pre-compression curve of the pre-compression-chamber; "E" represents the point where the retarded combustion, due to excess carbon in the mixture, is about to cease, being the point where the compressed air from the compressed air system of the engine ordinarily enters the cylinder to support and complete the combustion of the residual carbon of the initial mixture remaining unburnt in the combustion-chamber of the cylinder; "F" represents the final point of completed combustion due to the air supplied in the cylinder from "E" on to "F" from which point "F" on to point "G", because compressed air is still being admitted into the cylinder to said point "G", stratification of the burnt gases takes place in the combustion-chamber of the cylinder; "H" represents the point at which the exhaust-port of the cylinder opens; and "I" represents the point at which the same closes. The sectional area "J" represents the increased heat-influx due to retarded combustion, while the sectional area "K" represents the increased heat-influx due to completed combustion.

"B$^1$" and "B$^2$" represent variations of the curve "B" due to throttling of the transferring mixture as may occur by manipulating the throttle-valve 58.

In Fig. 42 the piston is shown in the head-end-dead-center position ready to come down on its working stroke,—the auxiliary air-timing-valve as well as the co-acting valve therefor being both closed, as shown, the dotted position of the piston representing the position thereof when the main auxiliary air-valve is ready to open. Fig. 43 shows the piston in its position, corresponding to point "E" on the card, Fig. 41, where the air-valves open to admit air into the cylinder to complete combustion; the dotted position of the piston in Fig. 43 represents the "F" position on the card where completed combustion ceases and where the air keeps coming in from then on to stratify the burnt gases in the cylinder, said stratifying air continuing to enter the cylinder until the piston reaches the position shown in Fig. 44 which corresponds to "G" on the curve, where the stratifying air ceases to enter the cylinder and therefore both valves 82 and 89 are closed as shown. Fig. 45 represents the position of the piston at the point of cracking the exhaust-port; the dotted position representing the piston in its "up" stroke when the same is compressing the pre-compressed mixture in the combustion-chamber of the cylinder. Fig. 46 represents the piston moved slightly beyond the dead center position ready to start down on its working stroke and shows both valves open at that time for admitting the compressed air for starting purposes, when the engine is started cold, or when the pressure in the combustion-chamber is lower than that of the compressed air of the compressed air supply of the engine.

Having thus described the parts of my invention in detail, the manner in which the same may be employed and operated is as follows:

First, however, it must be understood, as has already been suggested, that while my invention may be applicable to any of the ordinary internal combustion engines, whether of the two-cycle or four-cycle types, whether explosive or otherwise, the same is more particularly intended, and without being limited thereto, to be used in connection with the improved retarded combustion cycle disclosed in my aforesaid application and which cycle in this application is preferably employed with the enclosed types of valveless two-cycle engines.

Briefly, the improved retarded combustion cycle and the operation of an engine working thereon consists in pre-compressing the initial fuel constituents, which are proportioned in the first instance by suitable proportioning means, to provide enriched mixture or media, say in the proportion of one part gas to about four parts air, to insure the lacking oxygen in the fuel to prevent explosion thereof, but while non-explosive such mixture will, however, ignite and burn, but not completely, because of the lack of oxygen in the initial media to support such complete combustion; hence we have retarded combustion.

The enriched mixture admitted in the pre-compression chamber of the cylinder is preferably pre-compressed to about 40 lbs. ab., after which the same is transferred into the combustion-chamber of the cylinder and is again compressed to about 114.7 lbs. ab., and then with the piston ready to start on its working stroke the compressed mixture is ignited and instead of exploding because of the enriched condition thereof, burns and expands, as shown on the card, curve "B" Fig. 41. When the pressure within the combustion-chamber during this burning stroke drops to a point as "E" on the card which is equal to or slightly below that of the compressed air system of the engine and which represents a point previous to the ceasing of retarded combustion so that the flame still exists within the cylinder, the compressed air forces its way into the cylinder from the air supply and thus furnishes the necessary oxygen required to complete the combustion of the excess carbon still remaining unburnt in the initial media, and will thus cause further combustion to occur within the cylinder to the point "F" which represents the point at which all of the carboniferous matter in the initial media have been utilized and burnt by the supported combustion due to the oxygen introduced into the cylinder by the air system of the engine. The auxiliary compressed air-valve is timed to keep "open" until the piston reaches a point as "G", which is preferably just previous to the point of exhaust "H" and thus stratifies the burnt gases in the cylinder between the points "F" and "G" after which, upon reaching point "H" the burnt gases are exhausted from the cylinder and the cycle of the engine is repeated continually during the operation of the engine.

It will thus be observed that a two-cycle internal combustion engine operated on my improved retarded combustion cycle, must necessarily have an increased efficiency such as will compare favorably with the ordinary four-cycle explosive engine, the theory of the cycle being more fully described in my above-referred to application.

To provide operating mechanism for controlling the timing of the auxiliary air-valve and the ignition apparatus of an engine especially such as operates on my improved retarded combustion cycle, and to provide an internal combustion engine possessing more nearly the characteristics of the steam engine, as hereinbefore explained, is the object of my invention, the operation thereof being as follows:

With the link-motions of the engine adjusted to perform at the proper intervals with their respective cylinders for properly timing and actuating the compressed air-admission-valves and the ignition apparatus coupled therewith, the latter being adjusted preferably to generate the spark in the cylinders when the pistons are in a head-end-dead-center and ready to start on the working strokes thereof, with the fuel-proportioning-valve 76 properly set to supply an enriched mixture for the engine, as shown in Fig. 5, with the transfer-throttle-valve 58 set to allow the proper transferring of the pre-compressed mixtures from the pre-compression chambers of the cylinders into the combustion-chambers thereof, as is shown taking place in Fig. 8, with the compressed air-receiver charged with air of the proper pressure, say 114.7 lbs. ab., and with the engine set in "neutral" position, as shown in Figs. 1, 4, 11, 12 and 13, which is the resting or non-running position of the engine, the same is ready to perform as follows—it being understood that the operating performance is duplicated in each of the cylinders of the engine and an explanation of one will suffice for the others, viz;

In the cylinder 8, which is the middle cylinder of the engine, and in which the piston is positioned in the head-end-dead-center, Fig. 7, the fuel mixture delivered through the proportioning valve 76 into the intake manifold 80 has entered the pre-compression chamber 27 through the inlet-ports 33, so that when the piston 42 starts operating on its working stroke it seals the ports 33 and compresses such fuel mixture then in the pre-compression-chamber 27 of the cylinder to about 40 lbs. ab., and when the piston-transfer-port 45 registers with the pre-compression transfer-outlet-port 34, as shown in Fig. 8, the pre-compressed mixture is ushered through the transfer-valve 58 and the inlet-transfer-port 35 into the combustion-chamber 26 of the cylinder, then as the piston 42 starts back on its compression stroke in the combustion-chamber, it seals the exhaust-port 37, the inlet-transfer-port 35, and the pre-compression outlet-transfer-port 34, and again compresses the pre-compressed mixture transferred into said combustion-chamber from said pre-compression chamber through the transfer-valve of the cylinder, this time compressing said mixture to about 114.7 lbs. ab. which is the pressure of the compressed air supplied in the receiver 24. The receiver 24 connects with the compressed air-valves of the cylinder through the pipe 84 which is provided with the regulating-cock 84$^a$ and the valve 84$^b$, the former regulating the flow of the air through the pipe 84, while the latter serves to open the air supply or shut off the same from the engine, according as may be desired.

With the final compression stroke completed and the piston 42 positioned as shown in Figs. 5 and 7, the igniter under ordinary working conditions is timed to spark at that point through the spark-plug 41 when the compressed charge is ignited and the piston 42 starts on its working stroke because of the pressure and the expansion due to the burning of the fuel media in the cylinder. The pressure increases in the combustion chamber, as indicated by the curve "B" to the peak which is in the vicinity of 200 lbs. ab. and then starts decreasing during the retarded combustion period indicated on the card in Fig. 41, when at point "E" the pressure within the combustion-chamber, due to retarded combustion, has reached the initial compression pressure 114.7 lbs. ab., or the pressure of the auxiliary air system employed with the engine,—the full position of the piston in Fig. 43 representing this position at point "E" of the working stroke.

The main cylinder air-valves 82 may be timed to open the compressed air system to the cylinders of the engine, preferably when the pistons have passed the dead-center positions slightly, as indicated by the dotted position, Fig. 42, which may be 5° or so, or as is represented in Figs. 20 and 21 showing a crank about 10° beyond the dead-center for the running of the engine in the forward or reverse direction,—the air-valves 82 in said Figs. 20 and 21 being shown just in the act of cracking open to admit the compressed air from the auxiliary air supply into the engine cylinders. Thus it will be observed that the air supply valve is timed to open the air supply to the cylinder directly after the piston thereof passes the head-end-dead-center position, but in spite of that only under certain circumstances will the air passing through said open valve enter into the cylinder (as for example, when there is no compression in the combustion-chamber at all, or when the pressure within said combustion-chamber is below the pressure of the compressed air in the air supply, or when the spark fails to ignite the mixture within the cylinder) on account of the office of the automatically operated co-acting cylinder valve 89 which is normally held seated, as shown in Fig. 25, by the light compression spring 91, but which valve 89 will automatically open, as shown in Fig. 26, to admit compressed air coming from the main timing-valve 82 into the cylinder when the pressure within the valve-casing 88 and behind the valve 89 exceeds the pressure within the cylinder. So that under normal conditions, with the fuel mixture in the combustion end of the cylinder preferably compressed to an equal pressure to that of the compressed air in the auxiliary air supply, as for example, 114.7 lbs. ab., and with ignition taking place and retarded combustion occurring, which raises the pressure within the combustion-chamber as the curve "B" indicates the automatic co-acting-valve 89 will remain seated and "closed" until the piston reaches the point "E" on the card, which represents the point at which the pressure within the combustion-chamber of the cylinder has been reduced to the original and initial compression pressure of 114.7 lbs. ab. or rather the pressure of the compressed air in the auxiliary air system of the engine,—it being noted that at that point the flame is still alive within the cylinder, since burning is still going on therein. Thus while the main compressed air-timing-valve 82 has been "open" since a point a few degrees beyond the head-dead-center of the piston, the automatic coacting valve of that particular main valve 82 has been seated and closed because of the excess pressure within the combustion-chamber of the cylinder overcoming the same from the combustion-chamber side of the valve, as against the pressure behind it of the compressed air supply, and remains seated until about the point "E" on the card, when the pressure within the combustion-chamber of the cylinder begins to drop below the pressure of the compressed air of the air system and the valve 89 is forced to "open" as shown in Figs. 26 and 43.

The incoming air which is introduced into the combustion chamber of the cylinder immediately has its effect in reviving the combustion occurring therein, in that said air supplies the necessary oxygen required to complete the combustion of the then remaining unburnt and residual carbons of the initial media ignited. The main air-valve 82 is preferably allowed to remain "open" to a point as "G" on the card, which is just previous to the point of the exhaust opening "H" of the engine, corresponding to the position of the piston shown in full in Fig. 44 and represented by the positions shown in the diagrammatic Figs. 22 and 23 for either the forward or the reverse direction of the engine, when the air-valve 82 in either case is just in the act of "closing," with the crank positioned approximately at 135° or so beyond the head-dead-center position thereof, according as may be desired, but preferably previous to the point of exhaust in any event. With the compressed air thus entering into the combustion chamber of the cylinder at about point "E" as explained, and completing the combustion of the residual unburnt carbons before reaching the point "F" on the curve, therefore since the air continues to enter the cylinder until the piston reaches the point "G" on the curve, stratification of the burnt gases within the cylinder takes place after the point "F" of complete combustion is passed, and such stratifying air continues to enter the cylinder to the point "G" which comes just before the exhaust is reached. This stratifying operation of the burnt gases within the cylinder, in the case of a vertical type of engine, as the one shown in the drawings, has the natural tendency to cause the heavier gases to settle in the lower section of the combustion-chamber and therefore nearest to the exhaust-port, so that immediately upon the opening of the exhaust-port, the heaviest gases will leave the combustion-chamber and the fresh or lighter air at the top thereof will expand and purify the cylinder. Therefore with the purer and fresher air settled in the clearance-chamber of the combustion-chamber of the cylinder, the fresh transferring mixture coming from the pre-compression chamber, by means of the baffle section 48 of the piston-head, will be ushered up into the top or clearance chamber of the combustion-chamber of the cylinder, and will thus intermingle with the fresher air therein resulting from the stratifying operation of the engine, rather than with contaminated air from the burnt gases within the cylinder, as would otherwise be the case.

Now with the cycle of the engine explained, the working operations thereof as a unit, in the form of the three-cylinder self-starting and reversing engine shown in the drawings, is as follows:

It will be here noted that the "neutral" positions of the link-motions 111, 112 and 113, which operate the air timing-valves 82 and the ignition apparatus for their respective cylinders 7, 8 and 9, as shown in Figs. 13, 12 and 11, respectively, in each case "close" the air-timing-valve 82 and position the operating members of the ignition apparatus in the non-acting position, where no spark can possibly occur in any of the cylinders.

To run the engine in the "forward" direction, which is in the direction of the arrows marked "F," Figs. 4 and 5, the hand-wheel 164 is turned in the direction of the arrow marked "F" Fig. 1, which shifts the operating-segment 161 in the direction of the arrow marked "F" Fig. 29, and causes the shaft 151 which is secured thereto to rotate therewith, Fig. 30, and which carries with it the shifting-arms 155 and 156 which in turn are coupled with the shifting-links 158, 159 and 160 of the link-motions 113, 112, and 111, respectively, and positions the respective links 118, 129 and 140 for the forward running of the engine, as shown in Figs. 14, 15 and 16, respectively, which figures represent the link-motion, for the three-cylinders of the engine, relatively positioned for the operating of the engine in the "full forward" direction. It will thus be noted that in a three-cylinder engine, as shown in the drawings, the cranks 4, 5 and 6 are disposed angularly 120° apart from each other and the engine in coming to a stop will always balance itself and assume a position with one of its cylinders on head-end-dead-center, as shown in Figs. 4 and 5, or with one of its pistons positioned in crank-end-dead-center, as shown in Fig. 5ª; in either case the positioning of the other of the cranks will allow for the starting of the engine in either of its directions; so that with the engine stopping in the positions shown in Figs. 4 and 5 the cylinder 7, as shown in Fig. 13, for the forward running of the engine when left in the "neutral" or resting position of the engine, is ready to complete its working stroke, the middle cylinder 8 with the piston at head-end-dead-center Fig. 12, is ready to start its working stroke, while the cylinder 9, Fig. 11, is ready to compress the pre-compressed mixture in the combustion chamber of that cylinder. Therefore, it will be observed that in shifting the link-motions, which are operated simultaneously through the manipulation of the hand-wheel 164, through the turning of the hand-wheel of the engine from the "neutral" position indicated in the diagrammatic views in Figs. 11 to 13 inclusive to the "forward" operating positions shown in the relative diagrammatic views 14 to 16 inclusive, the operating member 97 of the igniter for the cylinder 7 is forced upward in the first instance and carries with it the armature member 99 and causes the latch-member 98 to engage with the timing-wedge 100 of the ignition apparatus for that cylinder and generates a spark in the combustion-chamber thereof which may start combustion therein if the point of completed combustion had not yet been reached in the cylinder before the engine stopped. The ignition apparatus for the different cylinders are each preferably timed to lead with the sparking operations thereof a few degrees earlier than the opening of the respective compressed air-admitting-valves 82, so that immediately after the spark occurs in the cylinder 7, whether or not combustion results therefrom within that cylinder, because the timing-valve is now opened by the shifting of the link-motion and the position of the piston is still within the open range of said valve, which, as suggested, may remain open until the crank goes 135° or so beyond the head-dead-center, the compressed air from the system at 114.7 lbs. ab. is admitted into the combustion-chamber of that cylinder 7 and forces the piston to start in the "forward" direction indicated by the arrow "F" which naturally causes the other two cylinders to start, after which performance the middle cylinder 8 follows suit, generates its spark, starts combustion within the cylinder, and immediately after opens the valve 82 ready to admit the compressed air from the air system of the engine when the pressure within the combustion-chamber, due to combustion, drops below the pressure of the air in the air system, as already explained (it being here noted in the event that the engine is started cold and no appreciable compression pressure is maintained within the combustion-chamber of the cylinders, or if the mixtures therein do not ignite, that the engine having been started and turned a few degrees by the first cylinder 7, the automatic co-acting valve in the cylinder 8 will open and admit the compressed air which will enter that cylinder and force the piston therein down on its working stroke). The cylinder 9 during this interval is in the act of compressing its fuel mixture in its combustion-chamber, when the compressed air-admitting-valve 82 is accordingly closed, as shown in Fig. 14, and the igniter is set in the non-sparking position, with the operating member 97 traveling in the direction of the arrow indicated in Fig. 14, so that when the piston within said cylinder 9 reaches the head-end-dead-center position, sparking will occur within said cylinder, and that cylinder will follow with its working stroke, and so the engine will continue to run in the forward direction with the respective cylinders thereof operating in their order continuously, namely, 7, 8 and 9, until the link-motions are brought back to "neutral" position indicated in Figs. 11, 12 and 13 by the manipulation of the hand-operating-wheel 164 of the engine.

In a similar manner when the cranks of the engine are set as shown in Fig. 5ª for "forward" running of the engine, the crank "a" will spark and admit compressed air and start down in the "F" direction, then when the crank "b" reaches head-dead-center position, that one will ignite and start down on the working stroke, and then "c," and so on in rotation during the running of the engine in the "forward" direction.

It will here be noted that with the links 118, 129 and 140 of the link-motions of the engine shifted to the "full forward" positions shown in Figs. 14, 15 and 16, that that position allows for the maximum travel for both the operating members of the ignition apparatus and the compressed air-valve 82; and therefore, since the link-motions are so connected on the engine as to permit the setting of the same in any position between the "neutral" position indicated in Figs. 4, 11, 12 and 13, and the "full forward" positions thereof indicated in Figs. 14, 15 and 16, and the "full reverse" positions indicated in Figs. 17, 18 and 19, that the link-motions provide for a variable setting thereof anywhere between said "neutral" positions and said "full forward" or "full reverse" positions, and thus permit of a varying operation for the air-admitting-valves and the ignition apparatus operated thereby and consequently a variable running of the engine itself, so that with the Stephenson link, as is incorporated in the drawings, in the embodiment of the invention shown therein, the engine speed may be varied thereby by the setting of the link-motions anywhere between the "neutral" positions thereof and the "full forward" or "full reverse" to give the required operations of the engine in either one or the other direction, according as may be desired; and in that connection, for retarding the sparking operation of the igniters for the slow running of the engine, if required, it will be observed that by manipulating the igniter timing-lever 108, the timing-cams 105 of the igniters 96 may be positioned to allow for the regulating of the timing-wedges 100 of the igniters to provide the necessary retarded sparking for slow running of the engine; and also, for further regulating the working operations of the engine according to the desired speeds and load conditions of the engine, the transfer throttle-valves 58 may be adjusted and regulated through the operation of the regulating transfer-throttling-lever 65, Fig. 1.

In a similar manner the engine may be caused to operate in the "reverse" direction, namely, in the direction of the arrows marked "R" Figs. 4 and 5, and by the turning of the hand-wheel 164 in the direction of the arrow marked "R" Fig. 1, which shifts the links 118, 129 and 140 of the link-motions 113, 112 and 111, respectively, in the opposite directions from the "neutral" positions shown in Figs. 11, 12 and 13, respectively, to the "forward" positions indicated in Figs. 14, 15 and 16, as shown in Figs. 17 to 19 inclusive which represent the link-motions shifted to "full reverse" positions, when it will be observed that the working conditions of the link-motions and the apparatus actuated thereby with reference to cylinders 7 and 9, are opposed to those shown for the corresponding cylinder in Figs. 14 and 16 for the "forward" running of the engine, as for example, the position of the air-valve 82 and the igniter apparatus for the cylinder 9 in Fig. 17 being similar to that shown for the cylinder 7 in Fig. 16 (representing the "forward" running of the engine), while for the cylinder 7 represented in Fig. 19, the working operations of the valve and the ignition apparatus are similar to the cylinder 9, Fig. 14, for the "forward" operation of the engine,—it being noted that in the "reverse" running of the engine the cylinder 9 will act first, exactly as the cylinder 7 did in the "forward" running of the engine, the middle cylinder 8 again following and the cylinder 7 following the middle cylinder, the sequence of operations of the cylinders for the "reverse" running of the engine being 9, 8 and 7 as against 7, 8 and 9 for the "forward" running of the engine. Similarly, the speed of the engine when operating in the reverse direction may be regulated by varying the positions of the link-motions anywhere between the "neutral" positions thereof and the "full reverse" shown in Figs. 11, 12 and 13 and 17, 18 and 19, respectively.

It will be observed that the telescoping rocker-shafts provide a compact means for communicating the independent actuations of the different link-motions to their respective co-acting igniters and air-valve mechanisms, and each shaft works independently of the others according as the link-motion with which the same is connected requires; and while I have shown the link-motions together on the end of the engine, I do not wish to be limited against positioning them separately and at different parts of the engine.

It will also be observed that by manipulating the transfer-throttling-valves of the engine, that the quantity of mixture for operating the engine may be controlled according as the working needs of the engine require.

It will thus be observed that the invention provides for an internal combustion engine which is highly efficient, simple in construction, and absolutely reliable in its operation, and possesses a great range of flexibility, both as to manipulation and to operation, and more nearly approaches the operations of the steam engine than any of the known types of internal combustion engines, and incorporates in its design and operation the characteristic features found to be advantageous in steam engine practice, and thus provides for a more practical and reliable internal combustion engine than any of the known types in the art today.

It may be understood that the engine may be designed to compress the necessary air for the auxiliary air system employed therewith, if desired, by any suitable means, as by trunking the cross-head as indicated by the piston type of cross-head in Fig. 1, which works in the cylinder 17 provided therefor and which is supplied with the necessary inlet and outlet valves as shown. Also, it may be observed that the principle of the engine may be applied to the larger sizes of engines within practical limits, whether for marine or land purposes, whether reversing or non-reversing, whether two or four-cycle types of engines, or whether horizontal or vertical, and will operate on a single cylinder as well as on a plurality of cylinders, and therefore I do not wish to be limited specifically to the application thereof to a three-cylinder engine, as shown in the drawings, nor do I wish to be limited to either reversing or non-reversing engines, two or four-cycle types of engines, horizontal or vertical, marine or land types of engines, or to the application of the specific type of valve motions shown in the drawings, any of the other common types of steam engine link-motions or valve-gears wherever applicable being included as part of my invention.

Claims:

1. In an engine of the character described, the combination of a two-cycle valveless type of cylinder provided with a pre-compression chamber; and means connecting the latter with the combustion chamber of said cylinder; a piston; a pitman; a crank-shaft; a mixing valve communicating with the inlet port of said pre-compression chamber adapted to proportion the fuel mixture entering said pre-compression chamber; a steam engine valve gear; a compressed air-admitting valve operated by said valve gear; an igniter operated by said valve gear; a compressed air supply coupled with said air-admitting-valve; and means for operating and controlling said valve gear.

2. In an engine of the character described, the combination of a two-cycle valveless type of cylinder provided with a pre-compression chamber; a piston; a crank-shaft; a fuel mixing and proportioning valve communicating with and discharging into the inlet port of said pre-compression chamber; a variable link-motion coupled with and operated by said crank-shaft; a throttle-valve interposed in the transfer-port between the pre-compression chamber outlet and the mixture inlet of the combustion chamber of said cylinder; a compressed air-admitting-valve communicating with the combination chamber of said cylinder and adapted to be operated by said link-motion; an igniter coupled with a spark-plug operating within said combustion chamber of said cylinder and adapted to be operated by said link-motion; a compressed air supply coupled with said air-admitting-valve; and means for shifting and controlling said link-motion.

3. In an engine of the character described, the combination of a two-cycle valveless type of cylinder, provided with a pre-compression chamber and means connecting the latter with the combustion chamber of said cylinder; a piston; a pitman; a crank-shaft; a steam engine valve gear; a compressed air-admitting-valve operated by said valve gear; an igniter operated by said valve gear; a compressed air supply coupled with said air-admitting-valve; and means for operating and controlling said valve gear.

4. In an engine of the character described, the combination of a two-cycle valveless type of cylinder, provided with a pre-compression chamber; a piston; a pitman; a crank-shaft; a link-motion coupled with and operated by said crank-shaft; a throttle-valve interposed in the transfer-port between the pre-compression chamber outlet and the mixture inlet of the combustion chamber of said cylinder; a compressed air-admitting-valve communicating with the combustion chamber of said cylinder and adapted to be operated by said link-motion; an igniter coupled with the sparking member within said combustion chamber of said cylinder and adapted to be operated by said link-motion; a compressed air supply coupled with said air-admitting-valve; and means for shifting and controlling said link-motion.

5. In an engine of the character described, the combination of a two-cycle valveless type of cylinder provided with a pre-compression chamber; a piston; a pitman; a crank-shaft; a link-motion coupled with and operated by said crank-shaft; an intermediate rocker-shaft, provided with rocker-arms, coupled with said link-motion; a throttle-valve interposed in the transfer-port between the pre-compression chamber outlet and the mixture inlet of the combustion chamber of said cylinder; a compressed air-admitting-valve communicating with the combustion chamber of said cylinder coupled with a rocker-arm on said intermediate rocker-shaft and adapted to be operated by said link-motion; an igniter coupled with the sparking member within said combustion chamber of said cylinder coupled with a rocker-arm on said intermediate rocker-shaft and adapted to be operated by said link-motion; a compressed air supply coupled with said air-admitting-valve; and means for shifting and controlling said link-motion.

6. In an engine of the character described, the combination of a two-cycle valveless type of cylinder provided with a pre-compression chamber and means connecting the latter with the combustion chamber of said cylinder; a piston; a pitman; a crank-shaft; a steam engine valve gear; a compressed air-admitting-valve operated by said valve gear; an igniter operated by said valve gear; a compressed air supply coupled with said air-admitting valve; means for supplying said compressed air supply with compressed air; and means for operating and controlling said valve gear.

7. In an engine of the character described, the combination of a two-cycle valveless type of cylinder provided with a pre-compression chamber and means connecting the latter with the combustion chamber of said cylinder; a piston; a pitman; a crank-shaft; a steam engine valve gear; an intermediate rocker-shaft, provided with rocker-arms, coupled with said valve gear; a compressed air-admitting-valve coupled with a rocker-arm on said intermediate rocker-shaft and adapted to be operated by said valve gear; an igniter coupled with a rocker-arm on said intermediate rocker-shaft and adapted to be operated by said valve gear; a compressed air supply coupled with said air-admitting-valve; means for supplying said compressed air supply with compressed air; and means for operating and controlling said valve gear.

8. In an engine of the character described, the combination of a two-cycle valveless type of cylinder provided with a pre-compression chamber; a piston; a pitman; a crank-shaft; a link-motion coupled with and operated by said crank-shaft; a throttle-valve interposed in the transfer-port between the pre-compression chamber outlet and the mixture inlet of the combustion chamber of said cylinder; a compressed air-admitting-valve communicating with the combustion chamber of said cylinder and adapted to be operated by said link-motion; an igniter coupled with a spark-plug operating within said combustion chamber of said cylinder and adapted to be operated by said link-motion; a compressed air supply coupled with said air-admitting-valve; means for supplying said compressed air supply with compressed air; and means for shifting and controlling said link-motion.

9. In an engine of the character described, the combination of a valveless two-cycle piston controlled cylinder having a combustion chamber, a pre-compression chamber and means connecting said chambers; a piston provided with a transfer-port, an exhaust section and an inlet baffle section; a pitman; a crank-shaft; a reversing and variable steam engine valve gear coupled with said crank-shaft and adapted to be operated thereby; a compressed air supply; an air valve member communicating with said combustion chamber provided with a slide valve operating therein and adapted to allow the admission of compressed air from said supply into said combustion chamber during a certain period on the working stroke of said piston; means connecting said slide-valve with said valve gear for actuating said valve; an igniter coupled with the sparking means within said combustion chamber; means connecting the operating member of said igniter with said valve gear for actuating the said igniter; and means for shifting and controlling said valve gear.

10. In an engine of the character described, the combination of a valveless two-cycle piston controlled cylinder, having a combustion chamber and a precompression chamber; a piston provided with a transfer-port, an exhaust section, and an inlet baffle section; a regulatable throttle-valve interposed between the fuel transfer-port of said pre-compression chamber and the fuel intake-port of said combustion chamber; a pitman; a crank-shaft; a reversing and variable link-motion coupled with said crank-shaft and adapted to be operated thereby; a compressed air supply; an air valve member communicating with said combustion chamber provided with a slide-valve operating therein and adapted to allow the admission of compressed air from said supply into said combustion chamber during a certain period on the working stroke of said piston; means connecting said slide-valve with said link-motion for actuating said valve; an igniter coupled with the sparking means within said combustion chamber; means connecting the operating member of said igniter with said link-motion for actuating said igniter; and means for shifting and controlling said link-motion.

11. In an engine of the character described, the combination of a valveless two-cycle piston controlled cylinder having a combustion chamber and a pre-compression chamber; a regulatable fuel mixing and proportioning valve communicating with the intake-port of said pre-compression chamber; a piston provided with a transfer-port, a regulatable throttle-valve interposed between the fuel transfer-port of said pre-compression chamber and the fuel intake-port of said combustion chamber, an exhaust section, and an inlet baffle section; a pitman; a crank-shaft; a reversing and variable link-motion coupled with said crank-shaft and adapted to be operated thereby; a compressed air supply; an air valve member communicating with said combustion chamber provided with a slide-valve operating therein and adapted to allow the admission of compresed air from said supply into said combustion chamber during a certain period on the working stroke of said piston; means connecting said slide-valve with said link-motion for actuating said valve; an igniter coupled with the sparking means within said combustion chamber; means connecting the operating member of said igniter with said link-motion for actuating the said igniter; and means for shifting and controlling said link-motion.

12. In an engine of the character described, the combination of a valveless two-cycle piston controlled cylinder having a combustion chamber, a pre-compression chamber and means connecting said chambers; a piston provided with a transfer-port, an exhaust section, and an inlet baffle section; a pitman; a crank-shaft; a reversing and variable steam engine valve gear coupled with said crank-shaft and adapted to be operated thereby; a compressed air supply; means for compressing air for said compressed air supply; an air valve member communicating with said combustion chamber provided with a slide-valve operating therein and adapted to allow the admission of compressed air from said supply into said combustion chamber during a certain period on the working stroke of said piston; means connecting said slide-valve with said valve gear for actuating said valve; an igniter coupled with the sparking means within said combustion chamber; means connecting the operating member of said igniter with said link-motion for actuating said igniter; and means for shifting and controlling said valve gear.

13. In an engine of the character described, the combination of a valveless two-cycle piston controlled cylinder having a combustion chamber, a pre-compression chamber and means connecting said chambers; a piston provided with a transfer-port, a regulatable throttle-valve interposed between the fuel transfer-port of said pre-compression chamber and the fuel intake-port of said combustion chamber, an exhaust section, and an inlet baffle section; a pitman; a crank-shaft; a reversing and variable steam engine valve gear coupled with said crank-shaft and adapted to be operated thereby; a compressed air supply; means for compressing air for said compressed air supply; an air valve member communicating with said combustion chamber provided with a slide-valve operating therein and adapted to allow the admission of compressed air from said supply into said combustion chamber during a certain period on the working stroke of said piston; means connecting said slide-valve with said valve gear for actuating said valve; an igniter coupled with the sparking means within said combustion chamber; means connecting the operating member of said igniter with said valve gear for actuating the said igniter; and means for shifting and controlling said link-motion.

14. In an engine of the character described, the combination of a valveless two-cycle piston controlled cylinder having a combustion chamber and a pre-compression chamber; a regulatable fuel mixing proportioning valve communicating with the intake port of said pre-compression chamber; a piston provided with a transfer-port, a regulatable throttle-valve interposed between the fuel transfer-port of said pre-compression chamber and the fuel intake-port of said combustion chamber, an exhaust section, and an inlet baffle section; a pitman; a crank-shaft; a reversing and variable steam engine valve gear coupled with said crank-shaft and adapted to be operated thereby; a compressed air supply; means for compressing air for said compressed air supply; an air valve member communicating with said combustion chamber provided with a slide-valve operating therein and adapted to allow the admission of compressed air from said supply into said combustion chamber during a certain period on the working stroke of said piston; means connecting said slide-valve with said valve gear for actuating said slide-valve; an igniter coupled with the sparking means within said combustion chamber; means connecting the operating member of said igniter with said valve gear for actuating the said igniter; and means for shifting and controlling said valve gear.

15. In an engine of the character described, the combination of a plurality of valveless two-cycle enclosed types of piston controlled cylinders; ported pistons provided with piston-rods and adapted to transfer the contents of the lower end of the cylinders to the upper and combustion end thereof; cross-heads coupled with said piston-rods; a crank-shaft provided with angularly disposed crank-pins; connecting-rods pivotally coupling said cross-heads with said crank-pins of said crank-shaft; compressed air-valves communicating with the combustion chambers of said cylinders; ignition apparatus coupled with said cylinders for ignition purposes; variable steam engine valve gears actuated by said crank-shaft and coupled with said air-valves and said ignition apparatus for operating the same; a compressed air supply; and means for operating said steam engine valve gears.

16. In an engine of the character described, the combination of a plurality of valveless two-cycle enclosed types of piston controlled cylinders; ported pistons provided with piston-rods; a mixing and proportioning valve discharging into the intake manifold of said cylinders; a throttling-valve interposed between the discharge outlet of the pre-compression chambers and the inlets of the combustion chambers of said cylinders; a crank-shaft provided with angularly disposed crank-pins; connecting-rods pivotally coupling said cross-heads with said crank-pins of said crank-shaft; compressed air valves communicating with the combustion chambers of said cylinders; ignition apparatus coupled with said cylinders for ignition purposes; variable link-motions actuated by said crank-shaft and coupled with said air-valves and said ignition apparatus for operating the same; a compressed air supply; and means for operating said link-motions.

17. A self-starting and reversing engine of the character described, consisting of the combination of a plurality of duplicate two-cycle valveless and enclosed types of cylinders; a plurality of duplicate pistons; a crank-shaft; a plurality of connecting rods coupling said pistons with said crank-shaft; a plurality of steam engine valve gears actuated by said crank-shaft; reciprocating air distributing valves for said cylinders; connecting means coupling said air distributing valves with their respective steam engine valve gears for communicating the reciprocating actions thereof thereto; igniters coupled with the sparking means within said cylinders; means for coupling the operating members of said igniters with their respective steam engine valve gears for actuating said igniters; a compressed air supply open to said air distributing valves; and means for shifting and controlling said steam engine valve gears for governing the operation of the engine.

18. A self-starting and reversing engine of the character described, consisting of the combination of a plurality of duplicate two-cycle valveless and enclosed types of cylinders having combustion and pre-compression chambers provided therein and means for connecting said chambers; a fuel proportioning and mixing valve discharging into the intake manifolds of said pre-compression chambers; a plurality of duplicate pistons; a crank-shaft; a plurality of connecting rods coupling said pistons with said crank-shaft; a plurality of steam engine valve gears actuated by said crank-shaft; reciprocating air distributing valves for said cylinders; connecting means coupling said air distributing valves with their respective steam engine valve gears for communicating the reciprocating actions thereof thereto; igniters coupled with the sparking means within said cylinder; means for coupling the operating members of said igniters with their respective steam engine valve gears for actuating said igniters; a compressed air supply open to said air distributing valves; means for supplying said compressed air supply with compressed air; and means for shifting and controlling said steam engine valve gears for governing the operation of the engine.

19. A self-starting and reversing engine of the character described, consisting of the combination of a plurality of duplicate two-cycle valveless and enclosed types of cylinders having combustion and pre-compression chambers provided therein; a fuel proportioning and mixing valve discharging into the intake manifolds of said pre-compression chambers; a plurality of duplicate pistons provided with transfer ports; exhaust and intake baffle sections, regulatable transfer-throttle-valves interposed between the fuel transfer-ports of said pre-compression chambers and the fuel intake-ports of said combustion chambers to said cylinder; a crank-shaft; a plurality of connecting rods coupling said pistons with said crank-shaft; a plurality of link-motions actuated by said crank-shaft; reciprocating air distributing valves for said cylinders; connecting means coupling said air distributing valves with their respective link-motions for communicating the reciprocating actions thereof thereto; igniters coupled with the sparking means within said cylinders; means for coupling the operating members of said igniters with their respective link-motions for actuating said igniters; a compressed air supply open to said air distributing valves; means for supplying said compressed air supply with compressed air; and means for shifting and controlling said link motions for governing the operation of the engine.

20. A self-starting and reversing engine of the character described, consisting of the combination of a plurality of duplicate two-cycle valveless and enclosed types of cylinders having combustion and pre-compression chambers provided therein; a fuel proportioning and mixing valve discharging into the intake manifolds of said pre-compression chambers; a plurality of duplicate pistons provided with transfer-ports, exhaust and intake baffle sections; regulatable transfer throttle-valves interposed between the fuel transfer-ports of said pre-compression chambers and the fuel intake ports of said combustion chambers in said cylinders; means for regulating said transfer-throttle-valves; a crank-shaft; a plurality of connecting rods coupling said pistons with said crank-shaft; a plurality of link-motions actuated by said crank-shaft; reciprocating air distributing valves for said cylinders; connecting means coupling said air distributing valves with their respective link-motions for communicating the reciprocating actions thereof thereto; igniters coupled with the sparking means within said cylinders; means for regulating and adjusting said igniters; means for coupling the operating members of said igniters with their respective link-motions for actuating said igniters; a compressed air supply open to said air distributing valves; means for supplying said compressed air supply with compressed air; and means for shifting and controlling said link-motions for governing the operating of the engine.

21. A self-starting and reversing engine of the character described, consisting of the combination of a plurality of duplicate two-cycle valveless and enclosed types of cylinders having combustion and pre-compression chambers provided therein and means for connecting said chambers; a fuel proportioning and mixing valve discharging into the intake manifolds of said pre-compression chambers; a plurality of duplicate pistons; a crank-shaft; a plurality of connecting rods coupling said pistons with said crank-shaft; a plurality of steam engine valve gears actuated by said crank-shaft; telescoping rocker-shafts coupled with said link-motions and provided with rocker-arms; reciprocating air distributing valves for said cylinders; connecting means coupling said air distributing valves with their respective rocker-arms of said telescoping rocker-shafts; igniters coupled with the sparking means within said cylinders; means for coupling the operating members of said igniters with their respective rocker-arms of said telescoping rocker-shafts for actuating said igniters; a compressed air supply open to said air distributing valves; means for supplying said compressed air supply with compressed air; and means for shifting and controlling said valve gears for governing the operation of the engine.

22. A self-starting and reversing engine of the character described, consisting of the combination of a plurality of duplicate two-cycle valveless and enclosed types of cylinders having combustion and pre-compression chambers provided therein; a fuel proportioning and mixing valve discharging into the intake manifolds of said pre-compression chambers; a plurality of duplicate pistons provided with transfer-ports, exhaust and intake baffle sections; regulatable transfer throttle valves interposed between the fuel transfer-ports of said pre-compression chambers and the fuel intake ports of said combustion chambers in said cylinders; means for regulating said transfer-throttle-valves; a crank-shaft; a plurality of connecting rods coupling said pistons with said crank-shaft; a plurality of link-motions actuated by said crank-shaft; telescoping rocker-shafts coupled with said link-motions and provided with rocker-arms; reciprocating air distributing valves for said cylinders; connecting means coupling said air distributing valves with their respective rocker-arms of said telescoping rocker-shafts; igniters coupled with the sparking means within said cylinders; means for regulating and adjusting said igniters; means for coupling the operating members of said igniters with their respective rocker-arms of said telescoping rocker-shafts for actuating said igniters; a compressed air supply open to said air distributing valves; means for supplying said compressed air supply with compressed air; and means for shifting and controlling said link-motions for governing the operation of the engine.

23. In an engine of the character described, the combination of an enclosed cylinder having a combustion chamber and a pre-compression chamber, the latter being provided with a fuel inlet port and a transfer outlet port, while the former is provided with a transfer inlet port and an exhaust port; a regulatable transfer valve interposed between said outlet transfer port and said inlet transfer port of said pre-compression and combustion chamber, respectively, of said cylinder; an engine bed; a frame member supporting said cylinder, and provided with a reciprocating cross-head; a piston provided with a transfer port, an exhaust cut-away section, an inlet baffle section, and a piston rod connected with said cross-head of said frame member; a crank-shaft rotatably supported in said engine bed; a connecting rod coupling said cross-head with said crank-shaft; a variable link-motion coupled with said crank-shaft and adapted to be operated thereby; a reciprocating compressed air valve provided with a discharge outlet communicating with the combustion chamber of said cylinder; means connecting said reciprocating compressed air valve with said link-motion for actuating said valve; ignition apparatus provided with sparking means within the combustion chamber of said cylinder; means connecting said ignition apparatus with said link-motion for actuating said ignition apparatus; means for controlling and regulating said link-motion; and means for supplying compressed air to said compressed air valve.

24. In an engine of the character described, the combination of an enclosed cylinder having a combustion chamber and a pre-compression chamber, the latter being provided with a fuel inlet port and a transfer outlet port while the former is provided with a transfer inlet port and an exhaust port; a regulatable transfer valve interposed between said outlet transfer port and said inlet transfer port of said pre-compression and combustion chambers, respectively, of said cylinders; an engine bed; a frame member supporting said cylinder, and provided with a reciprocating cross-head; a piston provided with a transfer-port, an exhaust cut-away section, an inlet baffle section, and a piston-rod connected with said cross-head of said frame members; a crank-shaft rotatably supported in said engine bed; a connecting rod coupling said cross-head with said crank-shaft; a reversing and variable link-motion coupled with said crank-shaft and adapted to be operated thereby; a reciprocating compressed air valve provided with a discharge outlet communicating with the combustion chamber of said cylinder; adjustable means connecting said reciprocating compressed air valve with said link-motion for actuating said valve; ignition apparatus provided with sparking means within the combustion chamber of said cylinder; adjustable means connecting said ignition apparatus with said link-motion for actuating said ignition apparatus; means for shifting and regulating said link-motion; and means for supplying compressed air to said compressed air valve.

25. In an engine of the character described, the combination of an enclosed cylinder having a combustion chamber and a pre-compression chamber, the latter being provided with a fuel inlet port and a transfer outlet port, while the former is provided with a transfer inlet port and an exhaust port; a regulatable transfer valve interposed between said outlet transfer port and said inlet transfer port of said pre-compression and combustion chambers, respectively, of said cylinder; means for regulating said transfer valve; a regulatable proportioning and mixing fuel valve communicating with said fuel inlet port of the pre-compression chamber of said cylinder; an engine bed; a frame member supporting said cylinder and provided with a reciprocating cross-head; a piston provided with a transfer port, an exhaust cut-away section, an inlet baffle section; and a piston-rod connected with said cross-head of said frame member; a crank-shaft rotatably supported on said engine bed; a connecting rod coupling said cross-head with said crank-shaft; a variable link-motion coupled with said crank-shaft and adapted to be operated thereby; a reciprocating compressed air-valve provided with a discharge outlet communicating with the combustion chamber of said cylinder; means connecting said reciprocating compressed air-valve with said link-motion for actuating said valve; ignition apparatus provided with sparking means within the combustion chamber of said cylinder; means connecting said ignition apparatus with said link-motion for actuating said ignition apparatus; means for controlling and regulating said link-motion; and means for supplying compressed air to said compressed air-valve.

26. In an engine of the character described, the combination of an enclosed cylinder having a combustion chamber and a pre-compression chamber, the latter being provided with a fuel inlet port and a transfer outlet port, while the former is provided with a transfer inlet port and an exhaust port; a regulatable transfer valve interposed between said outlet transfer port and said inlet transfer port of said pre-compression and combustion chambers, respectively, of said cylinder; means for regulating said transfer valve; a regulatable proportioning and mixing fuel valve communicating with said fuel inlet port of the pre-compression chamber of said cylinder; an engine bed; a frame member supporting said cylinder and provided with a reciprocating cross-head; a piston provided with a transfer port, an exhaust-cutaway section, an inlet baffle section, and a piston-rod connected with said cross-head of said frame member; a crank-shaft rotatably supported on said engine bed; a connecting rod coupling said cross-head with said crank-shaft; a reversing and variable link-motion coupled with said crank-shaft and adapted to be operated thereby; a reciprocating compressed air-valve provided with a discharge outlet co-acting valve communicating with the combustion chamber of said cylinder; adjustable means connecting said reciprocating compressed air-valve with said link-motion for actuating said valve; ignition apparatus provided with sparking means within the combustion chamber of said cylinder; adjustable means connecting said reciprocating compressed air-valve with said link-motion for actuating said valves; ignition apparatus provided with sparking means within the combustion chamber of said cylinder; adjustable means connecting said ignition apparatus with said link-motion for actuating said ignition apparatus; means for shifting and regulating said link-motion; and means for supplying compressed air to said compressed air-valve.

27. In an engine of the character described, the combination of an enclosed cylinder having a combustion chamber and a precompression chamber, the latter being provided with a fuel inlet port and a transfer outlet port, while the former is provided with a transfer inlet port and an exhaust port; a regulatable transfer valve interposed between said outlet transfer port and said inlet transfer port of said pre-compression and combustion chambers, respectively, of said cylinder; means for regulating said transfer valve; a regulatable proportioning and mixing fuel valve communicating with said fuel inlet port of the pre-compresssion chamber of said cylinder; an engine bed; a frame member supporting said cylinder and provided with a reciprocating cross-head; a piston provided with a transfer port, an exhaust cut-away section, an inlet baffle section, and a piston-rod connected with said cross-head of said frame member; a crank-shaft rotatably supported on said engine bed; a connecting-rod coupling said cross-head with said crank-shaft; a reversing and variable link-motion coupled with said crank-shaft and adapted to be operated thereby; a reciprocating compressed air-valve provided with a discharge outlet communicating with the combustion chamber of said cylinder; means connecting said reciprocating compressed air-valve with said link-motion for actuating the same, ignition apparatus provided with sparking means within the combustion chamber of said cylinder; means connecting said ignition apparatus with said link-motion for actuating said ignition apparatus; means for regulating and varying the setting of said ignition apparatus; means for controlling and regulating said link-motion; and means for supplying compressed air to said compressed air-valve.

28. In an engine of the character described, the combination of an enclosed cylinder having a combustion chamber and a pre-compression chamber, the latter being provided with a fuel inlet port and a transfer outlet port, while the former is provided with a transfer inlet port and an exhaust port; a regulatable transfer valve interposed between said outlet transfer port and said inlet transfer port of said pre-compression and combustion chambers, respectively, of said cylinder; an engine bed; a frame member supporting said cylinder and provided with a reciprocating cross-head; a piston provided with a transfer port, an exhaust cutaway section, an inlet baffle section and a piston-rod connected with said cross-head of said frame member; a crank-shaft rotatably supported on said engine bed; a connecting rod coupling said cross-head with said crank-shaft; a set of link-motion eccentrics for forward and reverse operations of the engine, secured to said crank-shaft; a reversing and variable link-motion coupled with said eccentrics and adapted to be operated thereby; a reciprocating compressed air-valve provided with a discharge outlet communicating with the combustion chamber of said cylinder; means connecting said reciprocating compressed air-valve with said link motion for actuating said valve; ignition apparatus provided with sparking means within the combustion chamber of said cylinder; means connecting said ignition apparatus with said link-motion for actuating said ignition apparatus; means for controlling and regulating said link-motion; and means for supplying compressed air to said compressed air-valve.

29. In an engine of the character described, the combination of an enclosed cylinder having a combustion chamber and a pre-compression chamber, the latter being provided with a fuel inlet port and a transfer outlet port, while the former is provided with a transfer inlet port and an exhaust port; a regulatable transfer valve interposed between said outlet transfer port and said inlet transfer port of said pre-compression and combustion chambers, respectively, of said cylinder; means for regulating said transfer valve; a regulatable proportioning and mixing fuel valve communicating with said fuel inlet port of the pre-compression chamber of said cylinder; an engine bed; a frame member supporting said cylinder and provided with a reciprocating cross-head; a piston provided with a transfer port, an exhaust cut-away section, an inlet baffle section, and a piston-rod connected with said cross-head of said frame member; a crank-shaft rotatably supported on said engine bed; a connecting-rod coupling said cross-head with said crank-shaft; a set of link-motion-eccentrics for forward and reverse operation of the engine, secured to said crank-shaft; a reversing and variable link-motion coupled with said eccentrics and adapted to be operated thereby; a reciprocating compressed air-valve provided with a discharge outlet communicating with the combustion chamber of said cylinder; means connecting said reciprocating compressed air-valve with said link-motion for actuating said valve; ignition apparatus provided with sparking means within the combustion chamber of said cylinder; means connecting said ignition apparatus with said link-motion for actuating said ignition apparatus; means for controlling and regulating said link-motion; and means for supplying compressed air to said compressed air-valve.

30. In an engine of the character described, the combination of an enclosed cylinder having a combustion chamber and a pre-compression chamber, the latter being provided with a fuel inlet port and a transfer outlet port, while the former is provided with a transfer inlet port and an exhaust port; a regulatable transfer valve interposed between said outlet transfer port and said inlet transfer port of said pre-compression and combustion chambers, respectively, of said cylinder; an engine bed; a frame member supporting said cylinder and provided with a reciprocating cross-head; a piston provided with a transfer port, an exhaust cut-away section, an inlet baffle section, and a piston-rod connected with said cross-head of said frame member; a crank-shaft rotatably supported in said engine bed; a connecting-rod coupling said cross-head with said crank-shaft; a reversing and variable link-motion coupled with said crank-shaft and adapted to be operated thereby; a rocker-shaft provided with rocker-arms and coupled with said link-motion and adapted to be operated thereby; a reciprocating compressed air-valve provided with a discharge outlet communicating with the combustion chamber of said cylinder; means connecting said reciprocating compressed-air-valve with a rocker-arm on said rocker-shaft for actuating said valve; ignition apparatus provided with sparking means within the combustion chamber of said cylinder; means connecting said ignition apparatus with a rocker-arm on said rocker-shaft for actuating said ignition apparatus; means for controlling and regulating said link-motion; and means for supplying compressed air to said compressed air-valve.

31. In an engine of the character described, the combination of a plurality of enclosed cylinders, each having a combustion chamber and a pre-compression chamber, the latter being provided with a fuel inlet port and a transfer outlet port, while the former is provided with a transfer inlet port and an exhaust port; regulatable transfer valves interposed between said outlet transfer ports and inlet transfer ports of said cylinders; an engine bed; a frame member adapted to support said cylinders and provided with a reciprocating cross-head for each of said cylinders; a piston for each of said cylinders provided with a side transfer port, an exhaust cut-away section, an inlet baffle section and a piston-rod connected with the respective cross-head of said frame member for the respective cylinder; a crankshaft provided with angularly disposed crank-arms for said cylinders and rotatably mounted in said engine bed; a connecting-rod pivotally coupling each of said cross-heads with its respective crank-arm of said crank-shaft; a reversing and variable steam engine valve gear for each of said cylinders, coupled with said crank-shaft and adapted to be operated thereby; telescoping rocker-shafts rotatably supported and each coupled with its respective steam engine valve gear and adapted to be independently operated thereby and provided with rocker-arms secured thereto for operating therewith; a reciprocating-compressed air-valve for each of said cylinders provided with automatic discharge valves communicating with the combustion chambers of said cylinders; means connecting said reciprocating compressed air-valves with their respective rocker-arms on said rocker-shafts for actuating the same; ignition apparatus for each of said cylinders provided with sparking means operating within the combustion chambers of said cylinders; means connecting the operating members of said ignition apparatus with their respective rocker-arms on said rocker-shafts for actuating said ignition apparatus; means for simultaneously controlling and regulating said steam engine valve gears and means for supplying compressed air to said compressed air-valves.

32. In an engine of the character described, the combination of a plurality of enclosed cylinders, each having a combustion chamber and a pre-compression chamber, the latter being provided with a fuel inlet port and a transfer outlet port while the former is provided with a transfer inlet port and an exhaust port; regulatable transfer valves interposed between said outlet transfer ports and said inlet transfer ports of said cylinders; an engine bed; means for regulating said transfer valves simultaneously; a common fuel intake manifold open to the fuel intake ports of the pre-compression chambers of said cylinders and provided with a regulatable proportioning and mixing valve at the receiving end thereof; a frame member adapted to support said cylinders and provided with a reciprocating cross-head for each of said cylinders; a piston for each of said cylinders provided with a side transfer port, an exhaust cut-away section, an inlet baffle section, and a piston-rod connected with the respective cross-head of said frame member for the respective cylinder; a crank-shaft provided with angularly disposed crank-arms for said cylinders and rotatably mounted in said engine bed; a connecting rod pivotally coupling each of said cross-heads with its respective crank-arm of said crank-shaft; a reversing and variable steam engine valve gear for each of said cylinders, coupled with said crank-shaft and adapted to be operated thereby; telescoping rocker-shafts rotatably supported and each coupled with its respective steam engine valve gear and adapted to be independently operated thereby and provided with rocker-arms secured thereto for operating therewith; a reciprocating compressed air valve for each of said cylinders provided with automatic discharge valves communicating with the combustion chambers of said cylinders; means connecting said reciprocating compressed air-valves with their respective rocker-arms on said rocker-shafts for actuating said valves; ignition apparatus for each of said cylinders provided with sparking means operating within the combustion chambers of said cylinders; means connecting the timing members of said ignition apparatus with their respective rocker-arms on said rocker-shafts for actuating said ignition apparatus; means for simultaneously controlling and regulating said steam engine valve gears; and means for supplying compressed air to said compressed air-valves.

33. In an engine of the character described, the combination of a plurality of enclosed cylinders, each having a combustion chamber and a pre-compression chamber, the latter being provided with a fuel inlet port and a transfer outlet port, while the former is provided with a transfer inlet port and an exhaust port; regulatable transfer valves interposed between said outlet transfer ports and said inlet transfer ports of said cylinders; an engine bed; a frame member adapted to support said cylinders and provided with a reciprocating cross-head for each of said cylinders; a piston for each of said cylinders provided with a side transfer port, an exhaust cut-away section, an inlet baffle section, and a piston rod connected with the respective cross-head of said frame member for the respective cylinder; a crank-shaft provided with angularly disposed crank-arms for said cylinders and rotatably mounted in said engine bed; a connecting rod pivotally coupling each of said cross-heads with its respective crank-arm of said crank-shaft; a reversing and variable steam engine valve gear for each of said cylinders, coupled with said crank-shaft and adapted to be operated thereby; telescoping rocker-shafts rotatably supported and each coupled with its respective steam engine valve gear and adapted to be independently operated thereby and provided with rocker-arms secured thereto for operating therewith; a reciprocating compressed air-valve for each of said cylinders, provided with automatic discharge valves communicating with the combustion chambers of said cylinders; means connecting said reciprocating compressed air-valves with their respective rocker-arms on said rocker-shafts for actuating said valves; ignition apparatus for each of said cylinders provided with sparking means operating within the combustion chambers of said cylinders; means connecting the timing members of said ignition apparatus with their respective rocker-arms on said rocker-shafts for actuating said ignition apparatus; means for simultaneously regulating and varying the timing of said ignition apparatus for said cylinders; means for simultaneously controlling and regulating said steam engine valve gears; and means for supplying compressed air to said compressed air-valves.

34. In an engine of the character described, the combination of a plurality of enclosed cylinders, each having a combustion chamber and a pre-compression chamber, the latter being provided with a fuel inlet port and a transfer outlet port, while the former is provided with a transfer inlet port and an exhaust port; regulatable transfer valves interposed between said outlet transfer ports and said inlet transfer ports of said cylinders; an engine bed; a frame member adapted to support said cylinders and provided with a reciprocating cross-head for each of said cylinders; a piston for each of said cylinders provided with a side transfer port, an exhaust cut-away section, an inlet baffle section and a piston-rod connected with the respective cross-head of said frame member for the respective cylinder; a crank-shaft provided with angularly disposed crank-arms for said cylinders and rotatably mounted in said engine bed; a connecting rod pivotally coupling each of said cross-heads with its respective crank-arm of said crank-shaft; a set of forward and reverse link-motion-eccentrics for each of said cylinders mounted on said crank-shaft and adapted to rotate therewith; a reversing and variable steam engine valve gear for each of said cylinders coupled with said eccentrics for the respective cylinder and operated thereby; a reversing and variable steam engine valve gear for each of said cylinders, coupled with said crank-shaft and adapted to be operated thereby; telescoping rocker-shafts rotatably supported and each coupled with its respective steam engine valve gear and adapted to be independently operated thereby and provided with rocker-arms secured thereto for operating therewith; a reciprocating compressed air valve for each of said cylinders provided with automatic discharge valves communicating with the combustion chambers of said cylinders; means connecting said reciprocating compressed air-valves with their respective rocker-arms on said rocker-shafts for actuating the said valves; ignition apparatus for each of said cylinders provided with sparking means operating within the combustion chambers of said cylinders; means connecting the timing members of said ignition apparatus with their respective rocker-arms on said rocker-shafts for actuating said ignition apparatus; means for simultaneously controlling and regulating said valve gears; and means for supplying compressed air to said compressed air-valves.

35. In an engine of the character described, the combination of a plurality of enclosed cylinders, each having a combustion chamber and a pre-compression chamber, the latter being provided with a fuel inlet port and a transfer outlet port, while the former is provided with a transfer inlet port and an exhaust port; regulatable transfer valves interposed between said outlet transfer ports and said inlet transfer ports of each of said cylinders; an engine bed; means for regulating said transfer valves simultaneously; a common fuel intake manifold open to the fuel intake ports of the pre-compression chambers of said cylinders and provided with a regulatable, proportioning and mixing valve at the receiving end thereof; a frame member adapted to support said cylinders and provided with a reciprocating cross-head for each of said cylinders; a piston for each of said cylinders provided with a side transfer port, an exhaust cut-away section, an inlet baffle section, and a piston-rod connected with the respective cross-head of said frame member for the respective cylinder; a crank-shaft provided with angularly disposed crank-arms for said cylinders and rotatably mounted in said engine bed; a connecting-rod pivotally coupling each of said cross-heads with its respective crank-arm of said crank-shaft; a set of forward and reverse link-motion eccentrics for each of said cylinders mounted on said crank-shaft and adapted to rotate therewith; a reversing and variable link-motion for each of said cylinders coupled with said eccentrics for the respective cylinder, and operated thereby; a reversing and variable link-motion for each of said cylinders, coupled with said crank-shaft and adapted to be operated thereby; telescoping rocker-shafts rotatably supported and each coupled with its respective link-motion and adapted to be independently operated thereby and provided with rocker-arms secured thereto for operating therewith; a reciprocating compressed air-valve for each of said cylinders provided with automatic discharge valves communicating with the combustion chambers of said cylinders; means connecting said reciprocating compressed air-valves with their respective rocker-arms on said rocker-shafts for actuating said valves; ignition apparatus for each of said cylinders provided with sparking means operating within the combustion chambers of said cylinders; means connecting the timing members of said ignition apparatus with their respective rocker-arms on said rocker-shafts for actuating the said ignition apparatus; means for simultaneously controlling and regulating said link-motions; and means for supplying compressed air to said compressed air-valves.

36. In a multi-cylinder engine of the character described, the combination of variable steam engine valve gears, compressed air valves operated thereby; igniters adjustably coupled with said steam engine valve gears and adapted to be timed and operated thereby; means for variably regulating said steam engine valve gears for controlling the operations of the engine; and means for supplying compressed air for said air-valves to be admitted into their respective cylinders.

37. In a multi-cylinder engine of the character described, the combination of variable steam engine valve gears, compressed air-valves operated thereby and provided with co-acting discharge members; igniters adjustably coupled with said steam engine valve gears and adapted to be timed and operated thereby; means for variably regulating said steam engine valve gears for controlling the operations of the engine; and means for supplying compressed air for said air-valves to be admitted into their respective cylinders.

38. In a multi-cylinder engine of the character described a compressed air admitting valve for each cylinder communicating with the combustion chamber thereof; an igniter coupled with each cylinder and adapted to control the sparking member thereof; a steam engine valve gear for each cylinder coupled with the crank-shaft of the engine and adapted to time and operate the compressed air admitting valve and the igniter for its respective cylinder; means for simultaneously operating all of said steam engine valve gears for relatively controlling the working functions of the cylinders of the engine; and means for supplying compressed air for said compressed air-admitting-valves.

39. In a multi-cylinder engine of the character described, a compressed air-admitting valve provided with an automatic coacting valve for each cylinder communicating with the combustion chamber thereof; an igniter coupled with each cylinder and adapted to control the sparking member thereof; a steam engine valve gear for each cylinder coupled with the crank-shaft of the engine and adapted to time and operate the compressed air-admitting-valve and the igniter for its respective cylinder; means for simultaneously operating all of said steam engine valve gears relatively controlling the working functions of the cylinders of the engine; and means for supplying compressed air for said compressed air-admitting-valves.

40. In combination with an engine of the character described, a steam engine valve gear operated by the crank-shaft thereof; and an ignition generating means, controlling and energizing the sparking member within the cylinder thereof, coupled with said steam engine valve gear and adapted to be operated thereby.

41. In a multi-cylinder engine of the character described, the combination of steam engine valve gears, compressed air-valves operated thereby; igniters coupled with said steam engine valve gears and adapted to be timed and operated thereby; means for regulating said steam engine valve gears for controlling the operations of the engine; and means for supplying compressed air for said air-valves to admit into their respective cylinders.

42. In a multi-cylinder engine of the character described, the combination of a Stephenson steam engine valve gear, compressed air valves operated thereby, igniters operated by said Stephenson valve gear and adapted to be variably timed thereby, means for regulating said Stephenson valve gear for controlling the operations of the engine, and means for supplying compressed air to said air valves to be admitted to their respective cylinders.

43. In an engine of the character described, the combination of a Stephenson link valve gear coupled with the crank shaft and adapted to be operated thereby; a compressed air supply valve timed and operated by said valve gear and provided with a discharging chamber having a pressure operated valve adapted to open into the combustion chamber of the engine for discharging the contents of said chamber therein.

In testimony whereof I have signed my name to this specification in the presence of two subscribing witnesses.

WILLIAM B. SMITH WHALEY.

Witnesses:
 REUBEN BROOKS,
 R. LICHTENSTEIN.